(12) United States Patent
Murata et al.

(10) Patent No.: US 11,012,588 B2
(45) Date of Patent: May 18, 2021

(54) INFORMATION PROCESSING DEVICE, FILE PROCESSING METHOD FOR INFORMATION PROCESSING DEVICE, AND NON-TRANSITORY RECORDING MEDIUM

(71) Applicant: SHARP KABUSHIKI KAISHA, Sakai (JP)

(72) Inventors: Ryohji Murata, Sakai (JP); Atsushi Matsuo, Sakai (JP); Akinori Ohnishi, Sakai (JP); Hiroki Munetomo, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/556,009

(22) Filed: Aug. 29, 2019

(65) Prior Publication Data

US 2020/0076981 A1 Mar. 5, 2020

(30) Foreign Application Priority Data

Sep. 5, 2018 (JP) .............................. JP2018-166360
Apr. 25, 2019 (JP) .............................. JP2019-084264

(51) Int. Cl.
*H04N 1/21* (2006.01)
*H04N 1/00* (2006.01)

(52) U.S. Cl.
CPC ....... *H04N 1/2179* (2013.01); *H04N 1/00411* (2013.01)

(58) Field of Classification Search
CPC .................................................... H04N 1/2179
USPC ........................................................ 358/1.15
See application file for complete search history.

(56) References Cited

U.S. PATENT DOCUMENTS

| 7,370,065 | B1* | 5/2008 | Rys | G06F 16/10 |
| 7,577,985 | B1* | 8/2009 | Urosu | G06F 21/6218 726/1 |
| 2002/0093582 | A1* | 7/2002 | Aoki | H04N 1/32101 348/333.02 |
| 2006/0085474 | A1* | 4/2006 | Tsubono | G06F 16/54 |
| 2006/0174054 | A1* | 8/2006 | Matsuki | G06F 16/166 711/100 |
| 2014/0137027 | A1* | 5/2014 | Kusakabe | G06F 16/168 715/781 |
| 2015/0281149 | A1* | 10/2015 | Masterson | H04L 51/02 715/752 |

FOREIGN PATENT DOCUMENTS

JP 2012-168721 A 9/2012

* cited by examiner

*Primary Examiner* — Jacky X Zheng
(74) *Attorney, Agent, or Firm* — ScienBiziP, P.C.

(57) ABSTRACT

A controller of an information processing device displays, on a display, a display screen having a first display region that displays a list of files, and a second display region that displays an operation button; selects one or more files from among the displayed list of files; and in response to selection of the operation button after a file is selected, renames the file in accordance with additional information associated with the operation button.

17 Claims, 28 Drawing Sheets

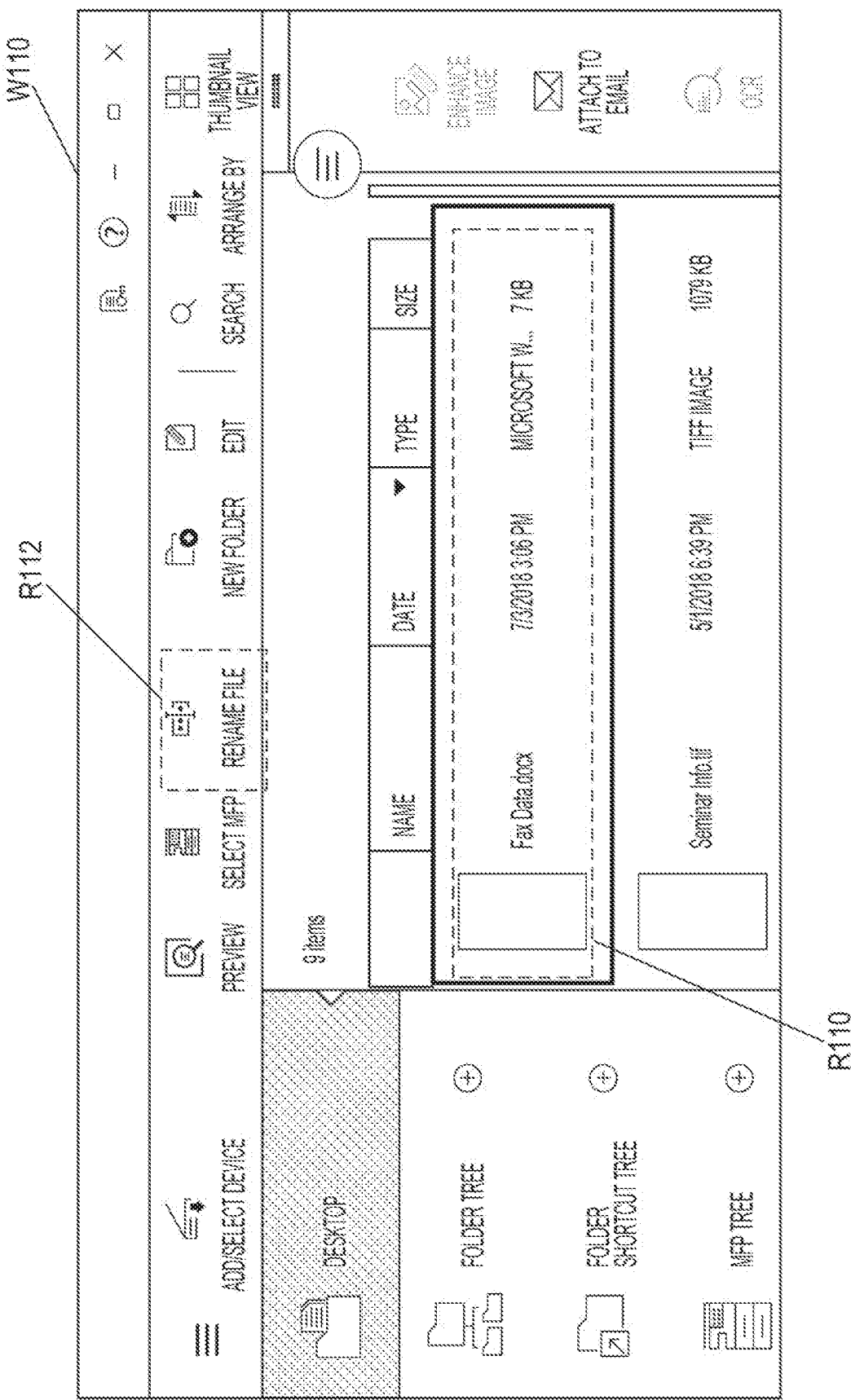

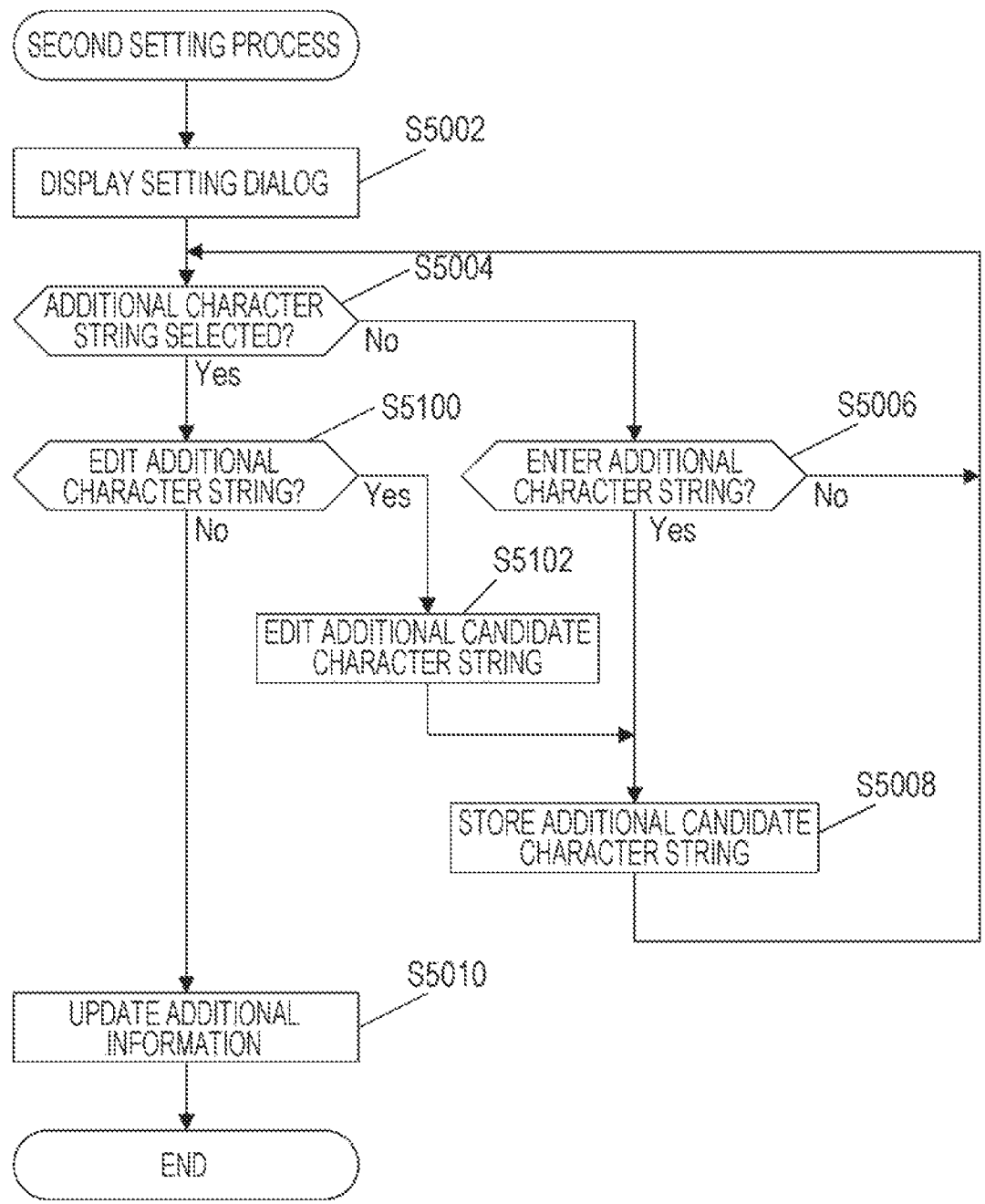

INFORMATION PROCESSING DEVICE, FILE PROCESSING METHOD FOR INFORMATION PROCESSING DEVICE, AND NON-TRANSITORY RECORDING MEDIUM

BACKGROUND

1. Field

The present disclosure relates to an information processing device, a file processing method for the information processing device, and a non-transitory recording medium.

2. Description of the Related Art

Workflow systems to circulate, check, and approve documents or files in offices or systems are known.

For example, Japanese Unexamined Patent Application Publication No. 2012-168721 discloses that a file server stores department unit folders for respective departments of a company, each department unit folder including a folder for documents under application, a folder for documents under circulation, and a folder for finally approved documents, such that when a draft document file is obtained from a client terminal, a file name is set in accordance with the workflow and the draft document file is stored in the folder for documents under application.

In the related art, a dedicated workflow system is used. Documents or files are difficult to check or approve unless the workflow system is used.

It is desirable to provide an information processing device, a file processing method for the information processing device, and a non-transitory recording medium that allow a user to easily check the status of a file using its file name.

SUMMARY

According to an aspect of the disclosure, there is provided an information processing device including a display and a controller. The controller displays, on the display, a display screen having a first display region that displays a list of files, and a second display region that displays an operation button; selects one or more files from among the displayed list of files; and in response to selection of the operation button after a file is selected, renames the file in accordance with additional information associated with the operation button.

According to another aspect of the disclosure, there is provided a file processing method for an information processing device. The file processing method includes displaying, on a display of the information processing device, a display screen having a first display region that displays a list of files, and a second display region that displays an operation button; selecting one or more files from among the displayed list of files; and in response to selection of the operation button after a file is selected, renaming the file in accordance with additional information associated with the operation button.

According to still another aspect of the disclosure, there is provided a non-transitory recording medium storing a program that, when executed by a computer including a display and a controller, causes the computer to execute displaying, on the display, a display screen having a first display region that displays a list of files, and a second display region that displays an operation button; selecting one or more files from among the displayed list of files; and in response to selection of the operation button after a file is selected, renaming the file in accordance with additional information associated with the operation button.

BRIEF DESCRIPTION OF THE DRAWINGS

FIG. 5B is a diagram illustrating an example operation (example screen) according to the first embodiment;

FIG. 19 is a flowchart illustrating another operation of the second setting process according to the fifth embodiment;

DESCRIPTION OF THE EMBODIMENTS

The following describes embodiments of the present disclosure with reference to the drawings. The following embodiments are examples of the present disclosure, and the technical scope of the disclosure as defined in the appended claims is not limited to the following embodiments.

1. First Embodiment

1.1 System Configuration

Figure 1:
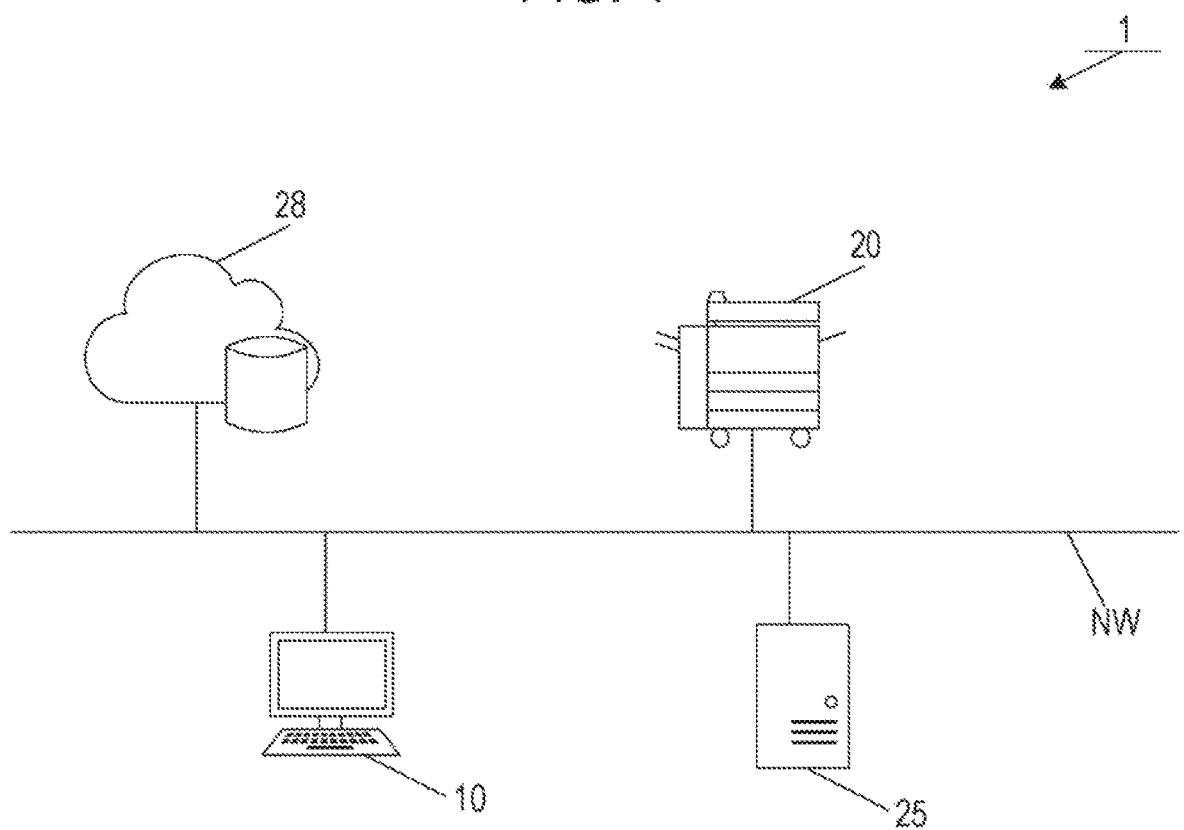
FIG. 1 is a diagram illustrating the overall configuration of a system according to a first embodiment.

FIG. 1 is a diagram illustrating the overall configuration of a system 1 according to a first embodiment. In the system 1, a terminal device 10 that is an information processing device, a multifunction peripheral 20 that is an image forming device, and a file management device 25 that is a device capable of storing files are connected to a network NW.

One or more devices of each type are connected to the network NW. For example, a plurality of terminal devices 10, a plurality of multifunction peripherals 20, and a plurality of file management devices 25 may be connected to the network NW.

The terminal device 10 is a computer or the like that serves as an information processing device. The terminal device 10 may be implemented as any other device such as a tablet terminal or a smartphone. Alternatively, a server device may further be connected, and the server device may execute an application service provider (ASP) tool and provide the ASP tool to the terminal device 10.

The multifunction peripheral 20 is an image forming device having a plurality of functions, and functions as, for example, a copying machine, a printing device (printer), a facsimile machine, and a scanner. The multifunction peripheral 20 is referred to as a digital multifunction peripheral (MFP) or the like.

The multifunction peripheral 20 in the system 1 may be a multifunction peripheral manufactured by the same vendor as a vendor that is a service provider or a multifunction peripheral manufactured by a vendor that is not a service provider. Even when the multifunction peripheral 20 is a multifunction peripheral manufactured by the same vendor as a vendor that is a service provider, the multifunction peripheral 20 supports or does not support the service in some cases.

The service provided in this embodiment is described as a file-sharing service, by way of example. While the multifunction peripheral 20 is described as an example of an image forming device, a device that implements a function by itself, such as a printer or a facsimile machine (fax) may also be used.

The file management device 25 is connected as a device that provides the file-sharing service. The file management device 25 is a device capable of providing the file-sharing service by using, for example, the Server Message Block (SMB) protocol, the Common Internet File System (CIFS), the AppleTalk Filing Protocol (AFP), or the File Transfer Protocol (FTP). The file management device 25 may be implemented as, instead of a server device, for example, a Network Attached Storage (NAS) device.

Any one of the multifunction peripheral 20 and the file management device 25 may be connected to the network NW, or none of them may be connected to the network NW. Additionally, a cloud server 28 may be connected to the system 1 via an external network. The cloud server 28 is also capable of managing files.

The terminal device 10 is capable of accessing a shared folder via the file-sharing service in a way similar to that when accessing a local folder. The terminal device 10 is also capable of executing file processing on both a local folder and a shared folder in a similar way.

1.2 Device Configuration

Next, the configurations of the devices included in the system 1 will be described with reference to the drawings. The configurations of the devices are examples, and each of the devices may have any desired configuration, as necessary.

1.2.1 Terminal Device

Figure 2:
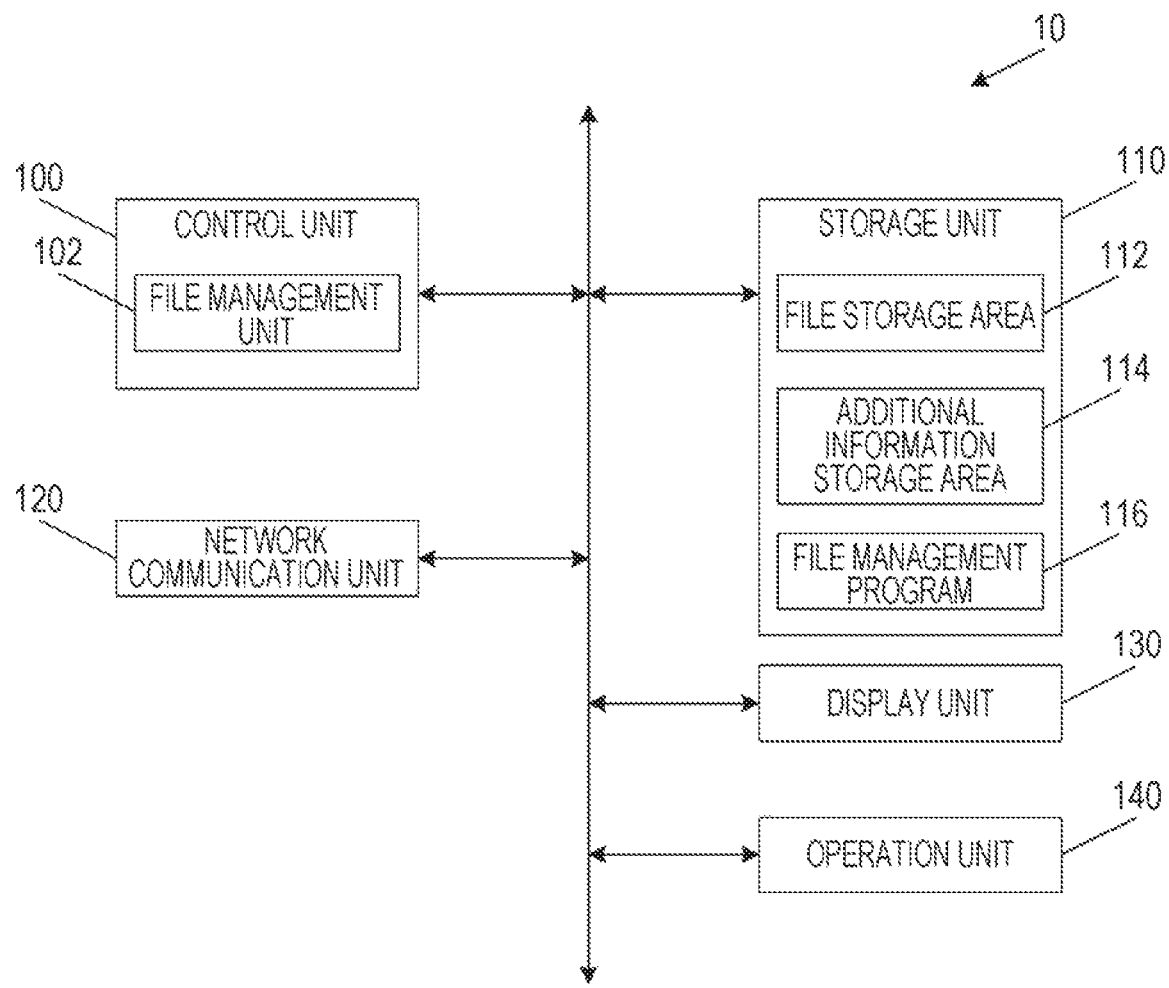
FIG. 2A is a diagram illustrating the configuration of a terminal device according to the first embodiment.
FIG. 2B is a diagram illustrating the configuration of an additional information storage area in a storage unit of the terminal device according to the first embodiment.

FIG. 2A is a diagram illustrating the configuration of the terminal device 10. The terminal device 10 includes a control unit 100, a storage unit 110, a network communication unit 120, a display unit 130, and an operation unit 140.

The control unit 100 controls the overall operation of the terminal device 10. The control unit 100 reads and executes various programs stored in the storage unit 110 to implement various functions. The control unit 100 is constituted by one or more arithmetic units (e.g., central processing units (CPUs)).

Further, the control unit 100 reads a program from the storage unit 110 and executes the program to function as a file management unit 102.

The file management unit 102 implements a function of managing files in response to reading and executing of a file management program 116 stored in the storage unit 110. The file management unit 102 executes various processes such as displaying a list of files in a folder (shared folder) and assigning a shared folder for other devices as accessible. The file management unit 102 also implements a function of executing various processes for a file. For example, the file management unit 102 is capable of copying, deleting, moving, renaming, or opening a file.

The storage unit 110 is a function unit that stores various programs used for the operation of the terminal device 10, and various data. The storage unit 110 is constituted by, for example, a solid state drive (SSD) that is a semiconductor memory, a hard disk drive (HDD) that is a magnetic disk, or the like. Alternatively, the storage unit 110 may be a Universal Serial Bus (USB) connected external storage device or a network-accessible cloud area, for example.

The storage unit 110 has a file storage area 112 that can store various files, and an additional information storage area 114. Further, the storage unit 110 stores the file management program 116.

The file storage area 112 can store various files such as text files, data files, and image files of users. For example, the control unit 100 is capable of transmitting a file stored in the file storage area 112 to the multifunction peripheral 20 or storing a file received from the multifunction peripheral 20 in the file storage area 112. A file stored in the file storage area 112 is referred to as a "local file", if necessary.

The additional information storage area 114 stores, as additional information, information used to perform a file renaming process by the file management unit 102. An example data configuration of the additional information storage area 114 is illustrated in FIG. 2B.

The additional information storage area 114 stores, as additional information, an "item" and "content" set for the item in association with each other. In FIG. 2B, the beginning or end of a file name is stored as a position of an additional character string (additional character string position). A character string to be actually added (additional character string) is also stored. In FIG. 2B, the "beginning of a file name" is stored as the position of the additional character string, and "confirmed" is stored as a specific example of the additional character string.

The file management program 116 is a program capable of implementing file management. The control unit 100 reads and executes the file management program 116 to implement various processes described below.

The network communication unit 120 communicates with another device, the multifunction peripheral 20, or a server device via the network NW. The network NW may be a wired or wireless network. The network communication unit 120 may be connected to an access point using a wireless local area network (WLAN) and may be connected to the network NW. In this embodiment, a typical LAN is described as an example. Alternatively, wide area network (WAN) technologies such as Long Term Evolution (LTE), 4G and 5G may be used.

The display unit 130 is capable of displaying various types of information and is implementable as a device such as a liquid crystal display (LCD) or an organic electroluminescent (EL) display. The operation unit 140 accepts operation input from a user. For example, the operation unit 140 may be implemented using hardware keys or software keys, or may be implemented as an external input device such as a keyboard or a mouse. The display unit 130 and the operation unit 140 may be integrated into a touch panel.

1.2.2 Multifunction Peripheral

Figure 3:
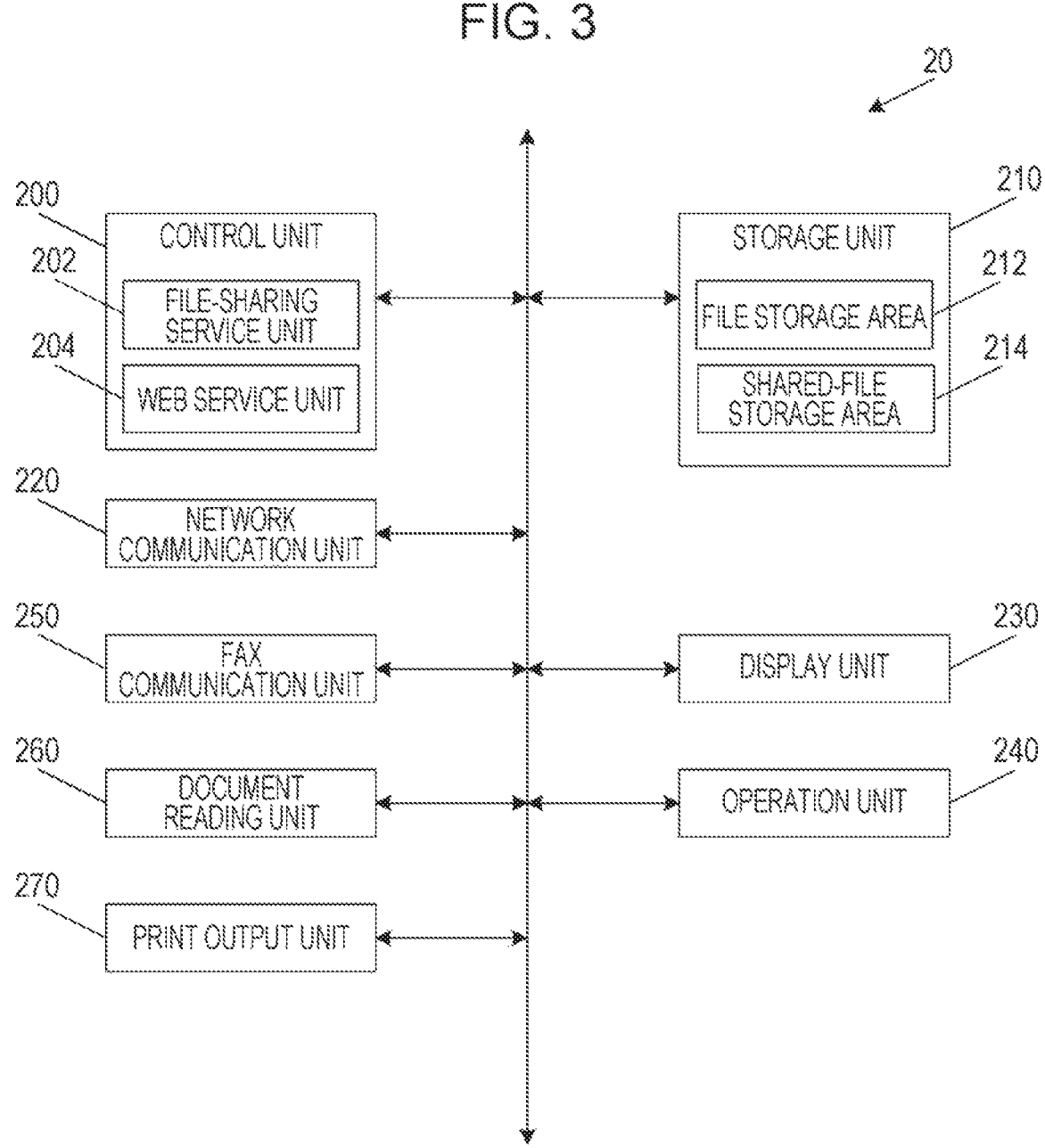
FIG. 3 is a diagram illustrating the configuration of a multifunction peripheral according to the first embodiment.

The configuration of the multifunction peripheral 20 will be described with reference to FIG. 3. The multifunction peripheral 20 includes a control unit 200, a storage unit 210, a network communication unit 220, a display unit 230, an operation unit 240, a fax communication unit 250, a document reading unit 260, and a print output unit 270.

The control unit 200 controls the overall operation of the multifunction peripheral 20. The control unit 200 reads and executes various programs stored in the storage unit 210 to implement various functions. The control unit 200 is constituted by one or more arithmetic units (e.g., CPUs).

Further, the control unit 200 reads a program stored in the storage unit 210 and executes the program to function as a file-sharing service unit 202 and a web service unit 204.

The file-sharing service unit 202 provides a file-sharing service. For example, the file-sharing service unit 202 provides the service of being able to access files stored in a shared-file storage area 214 to the terminal device 10 that has been authenticated or an authenticated user. The files stored in the shared-file storage area 214 are referred to as "shared files", if necessary.

The web service unit 204 provides a web service to other devices. For example, the web service unit 204 provides, when accessed from another device, a settings screen or the like in form of web page. In this embodiment, the web service unit 204 is capable of setting the permission or prohibition of provision of a shared folder by the file-sharing service unit 202. Additionally, the web service unit 204 is capable of providing a screen on which various settings of the multifunction peripheral 20 are made in form of web page.

The storage unit 210 is a function unit that stores various programs used for the operation of the multifunction peripheral 20, and various data. The storage unit 210 is constituted by, for example, an SSD that is a semiconductor memory, an HDD that is a magnetic disk, or the like. Alternatively, the storage unit 210 may be a USB connected external storage device or a network-accessible cloud area, for example.

The storage unit 210 has a file storage area 212 and the shared-file storage area 214 as areas that can store various files.

The file storage area 212 and the shared-file storage area 214 can store various files such as text files, data files, and image files of users. For example, the control unit 200 stores a document file received from the terminal device 10 via the network communication unit 220. The control unit 200 may also store an image file received by the fax communication unit 250 and an image file of image data of a document read by the document reading unit 260.

A file stored in the shared-file storage area 214 can be accessed by the terminal device 10 as a shared file. The term "accessing a file" is used to indicate being able to read, write, or delete a file. The term "being able to access a folder" is used to indicate being able to read files stored (or contained) in the folder or being able to display the files as a list. The term "being able to access a folder" also used to indicate being able to create, delete, or rename a sub-folder.

The network communication unit 220 communicates with another device or a server device via the network NW. The network NW may be a wired or wireless network. The network communication unit 220 may be connected to an access point using a WLAN and may be connected to the network NW. In this embodiment, a typical LAN is described as an example. Alternatively, WAN technologies such as LTE, 4G, and 5G may be used.

The display unit 230 is capable of displaying various types of information and is implementable as a device such as an LCD or an organic EL display. The operation unit 240 accepts operation input from a user. For example, the operation unit 240 may be implemented using hardware keys or software keys, or may be implemented as an external input device such as a keyboard or a mouse. The display unit 230 and the operation unit 240 may be integrated into a touch panel.

The fax communication unit 250 implements a fax transmission function. For example, image data received via an Integrated Services Digital Network (ISDN) line or via the Internet is stored in the file storage area 212 or the shared-file storage area 214. Further, a file stored in the file storage area 212 or the shared-file storage area 214 may be transmitted to another fax device.

The document reading unit 260 reads a document. Specifically, the document reading unit 260 is constituted by a scanner. The read document is output to the file storage area 212 or the shared-file storage area 214 as image data.

The print output unit 270 performs a print output operation based on a text file, image data, or the like. For example, the print output unit 270 outputs image data onto a print sheet. The print output unit 270 is constituted by a laser printer, for example.

1.3 Process Flow

Processes executed by the control unit 100 in accordance with programs read from the storage unit 110 will be described with reference to the drawings, as necessary.

Figure 4:
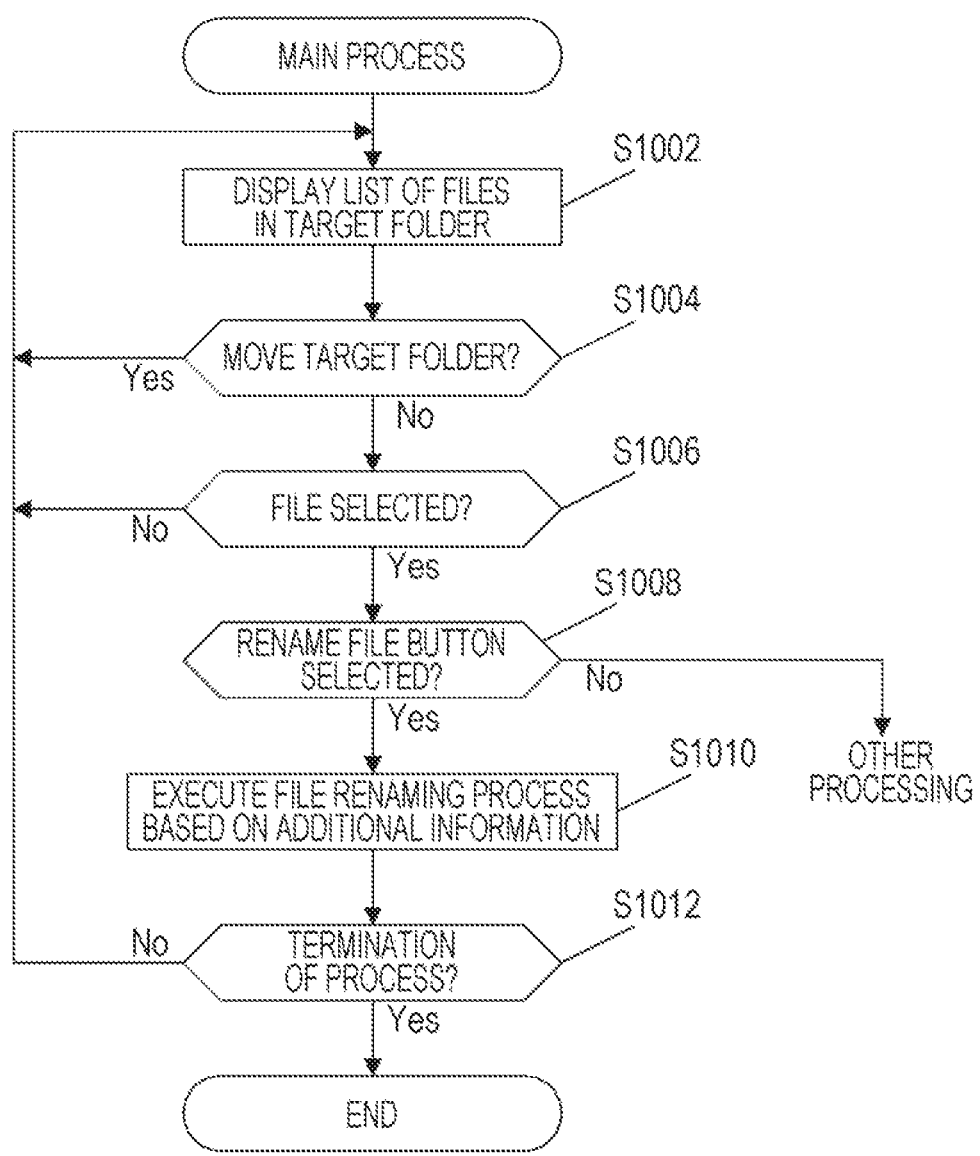
FIG. 4 is a flowchart illustration an operation of a main process according to the first embodiment.

A main process executed by the file management unit 102 (the control unit 100) will be described with reference to FIG. 4.

The file management unit 102 displays a list of files in a target folder (step S1002). The target folder indicates the current folder. The current folder may be at an initially set folder position or the last accessed folder position. When an operation of moving the target folder is performed (step S1004: Yes), the file management unit 102 moves the folder and displays a list of files in the folder (step S1002).

The folder is a folder selected by a user, and may be a local folder or a shared folder. Alternatively, the folder may be a folder on the cloud.

When one or more files are selected from among the displayed list of files by the user (step S1006: Yes), the file management unit 102 determines whether a Rename File button is selected (step S1008).

If the file management unit 102 determines that the Rename File button is selected by the user (step S1008: Yes), a file renaming process is executed based on additional information stored in the additional information storage area 114 (step S1010).

The additional information indicates whether to add an additional character string at the beginning or end of the file name. The additional information also specifically indicates the additional character string.

For example, as the additional information, the "beginning of the file name" indicating the position of the additional character string and the additional character string indicating "confirmed" are stored. In this case, when the file management unit 102 executes a file renaming process on a file with the name "test.pdf", the file is renamed to "confirmed_test.pdf".

It is desirable to insert a delimiter between the additional character string and the original file name or to add a character string for identifying the additional character string to the additional character string and the original file name. The file name may be changed to "[confirmed] test.pdf", for example.

When an additional character string is to be added to the end of the name, it is desirable to add the additional character string to a portion except for the extension. For example, the file described above is renamed to "test_confirmed.pdf" or "test[confirmed].pdf". Alternatively, the additional character string may be simply added to the end of the file name to rename the file to "test.pdf[confirmed]".

If termination of the process is selected by the user, the process ends (step S1012: Yes), or, otherwise, the process is repeatedly executed from step S1002. After a file is selected, the control unit 100 may execute various processes such as copying and editing the file (step S1008: No).

1.4 Example Operation

Figure 5A:
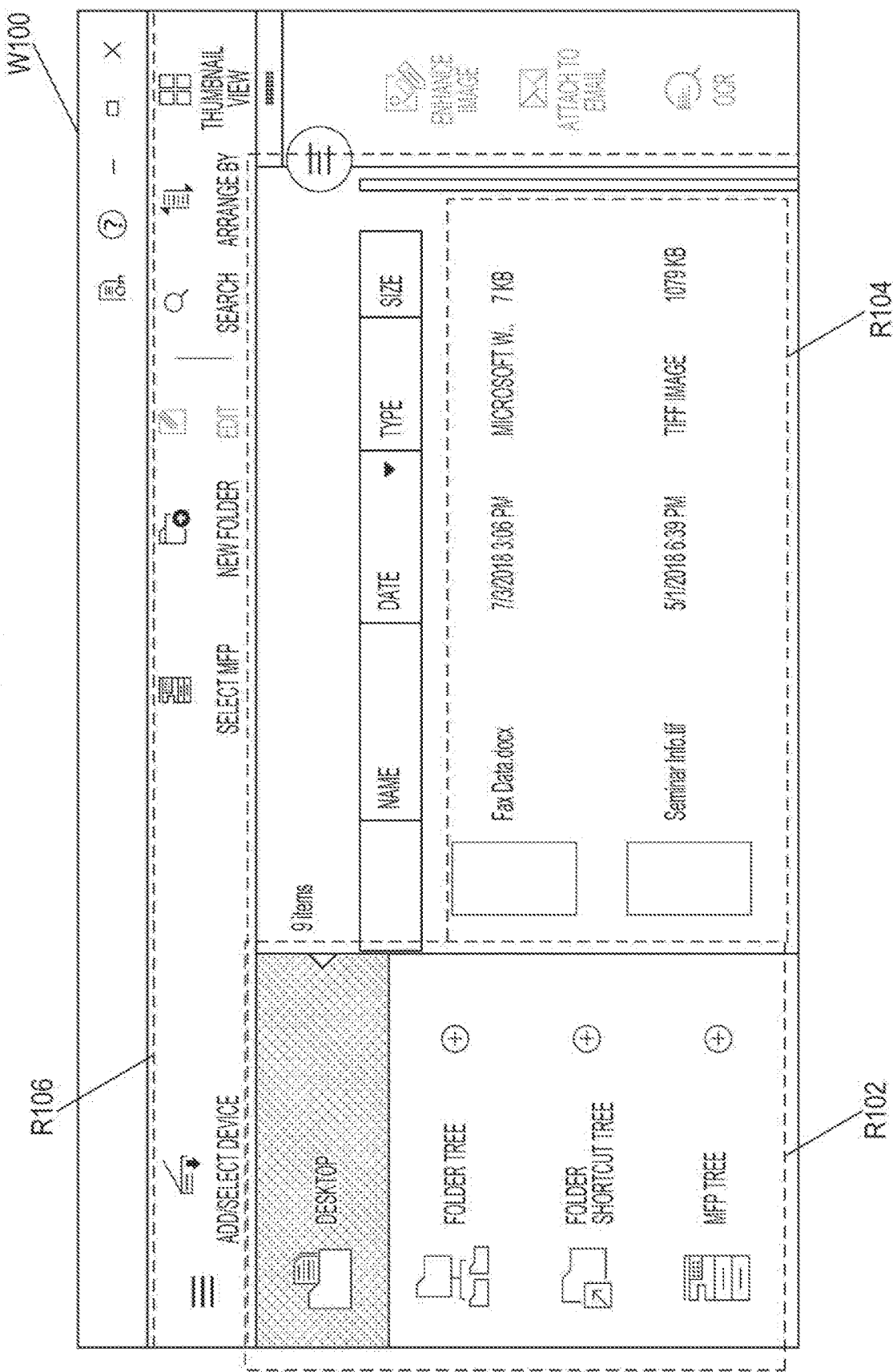
FIG. 5A is a diagram illustrating an example operation (example screen) according to the first embodiment.

Next, an example operation according to this embodiment will be described with reference to example screens. FIG. 5A illustrates a display screen W100 that is an example display screen indicating the initial state in a file management process according to this embodiment. The display screen W100 includes a folder area (R102) that displays folders, a list view area (R104) that displays a list of files, and an operation area (R106) where operation input can be made.

In the area R102, types of accessible folders are displayed. In this embodiment, access to a predetermined local folder (e.g., a Desktop folder) is available. In the area R102, network drive folders, shared folders for the multifunction peripheral 20, and folders on the cloud are further displayed.

The folders can be displayed as trees. A user is able to select a sub-folder as well as a root folder.

When any of the folders is selected by the user, the control unit 100 displays the files included in the selected folder in list view in the area R104. As illustrated in FIG. 5A, the files can be displayed in a plurality of ways such as detailed view in which the thumbnails, names, dates, types, and sizes of the files are displayed, and simple view in which only the file names are displayed.

The area R106 is an operation area where operation buttons, each of which is used to accept one of various operation inputs, are displayed. The area R106 is usually called a toolbar. For example, in FIG. 5A, operation buttons used to perform operations for a folder (root folder), such as an Add/Select Device button and a Select MFP button, and operation buttons used to perform operations such as creating a new folder are displayed.

Other buttons, such as a Search button to search for a file, an Arrange By button to change the sort order of files, and a Thumbnail View button to switch the display method, are displayed. Additionally, operation buttons available when a desired file is selected as appropriate, such as an Edit button, an Enhance Image button, an Attach to Email button, and a Convert by OCR button, are displayed. In FIG. 5A, these buttons are grayed out and are not selectable since no file is selected.

The operation buttons may be displayed as menu text instead of as graphical objects, marks, pictograms, or icons. In this embodiment, as illustrated in FIG. 5A, operation buttons are displayed using both graphical objects (icons) and text.

When one of the files displayed in the area R104 illustrated in FIG. 5A is selected by the user, a transition to a display screen W110 illustrated in FIG. 5B occurs. FIG. 5B indicates that a file in an area R110 has been selected. At this time, a single file may be selected or a plurality of files may be selected.

When a file is selected, operation buttons displayed in the operation area are changed. An initially displayed operation button may be made selectable, or a new operation button may be displayed. In FIG. 5B, an operation button available for operation input to rename a file (R112) is newly displayed.

Figure 6:
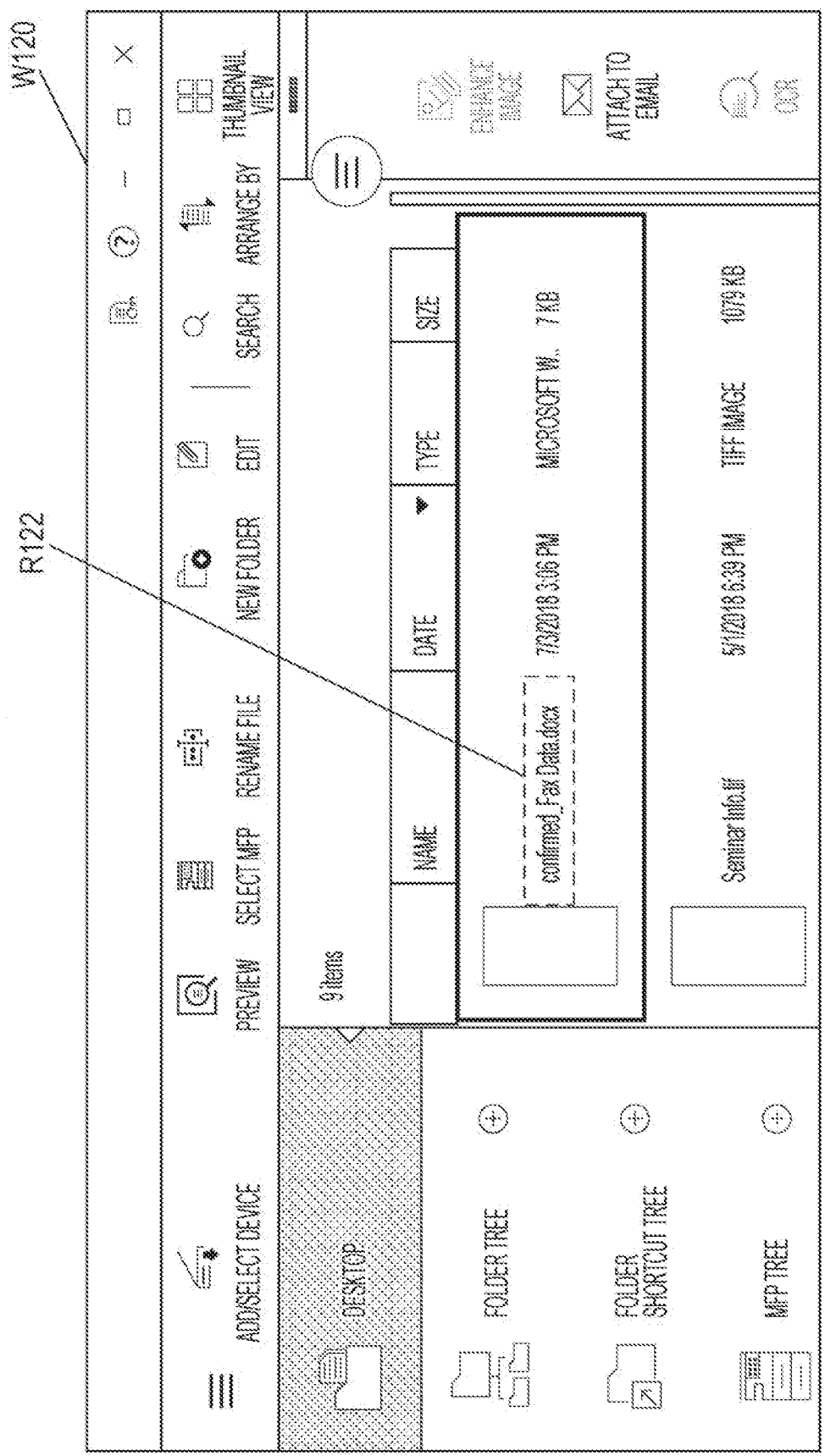
FIG. 6 is a diagram illustrating an example operation (example screen) according to the first embodiment.

When renaming of a file is selected by the user, a transition to a display screen W120 illustrated in FIG. 6 occurs. The control unit 100 refers to additional information and executes a file renaming process. As a result of the file renaming process, the selected file "Fax Data.docx" is renamed such that the additional character string "confirmed" is added to the beginning of the file name.

At this time, a delimiter may further be added to indicate the additional character string, or the additional character string may be identified in parentheses or in any other suitable way.

As described above, according to this embodiment, a user is only required to select a file and then select the "Rename File" operation button to easily rename the file such that an additional character string is added to the file name.

That is, an information processing device serving as the terminal device 10 described above allows the user to easily check the status of a file by renaming the file with a simple operation. In addition, only by using the information processing device, the user is able to rename a file with a simple operation without using any dedicated workflow system.

2. Second Embodiment

A second embodiment will now be described. The second embodiment is an embodiment in which a user is able to set additional information. In the second embodiment, the function configuration and the process flow are the same as those in the first embodiment, and a description will be given focusing on the difference from the first embodiment.

Figure 7:
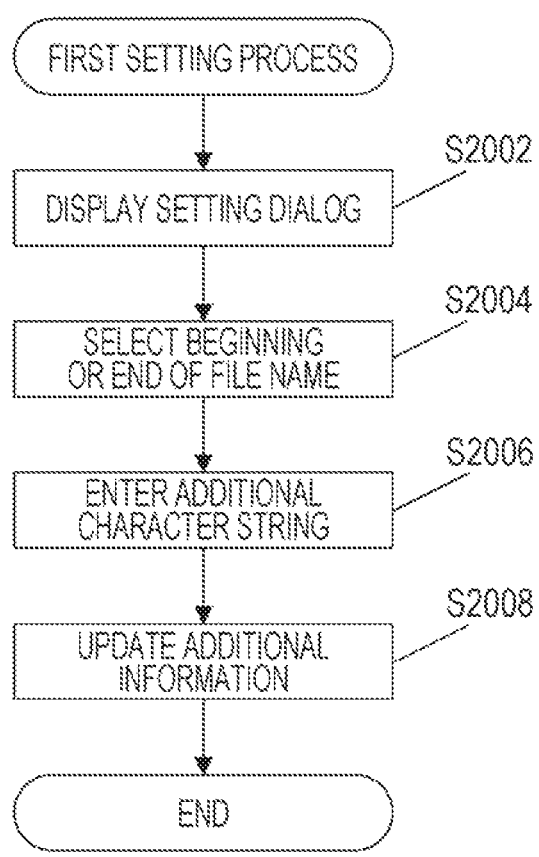
FIG. 7 is a flowchart illustrating an operation of a first setting process according to a second embodiment.

In this embodiment, the control unit 100 is capable of executing a first setting process in addition to the process according to the first embodiment. The first setting process executed by the control unit 100 will be described with reference to an operation flow illustrated in FIG. 7.

When the user performs an operation of executing the first setting process, the control unit 100 displays a setting dialog (step S2002). The setting dialog may be displayed as a window or in a separate screen.

Then, the control unit 100 selects the beginning or end of the file name as the position where an additional character string is to be added (step S2004). Further, the control unit 100 receives a character string entered by the user as an additional character string (step S2006).

The entered additional character string is an arbitrary character string. Desirably, the additional character string is a character string that allows the user to understand the content of the process once they view the file name. For example, a character string, such as the suffix -ed, "confirmed", "processed", "under confirmation", "yet to be processed", "requested", or "internal use only", is preferable. More preferably, a character string containing the suffix -ed is used as the additional character string. The character string may be a character string selected by the user from among predetermined character strings.

Then, the control unit 100 updates the additional information with the selected and entered content described above (step S2008). That is, the control unit 100 updates the additional information stored in the additional information storage area 114 or stores new additional information.

Figure 8A:
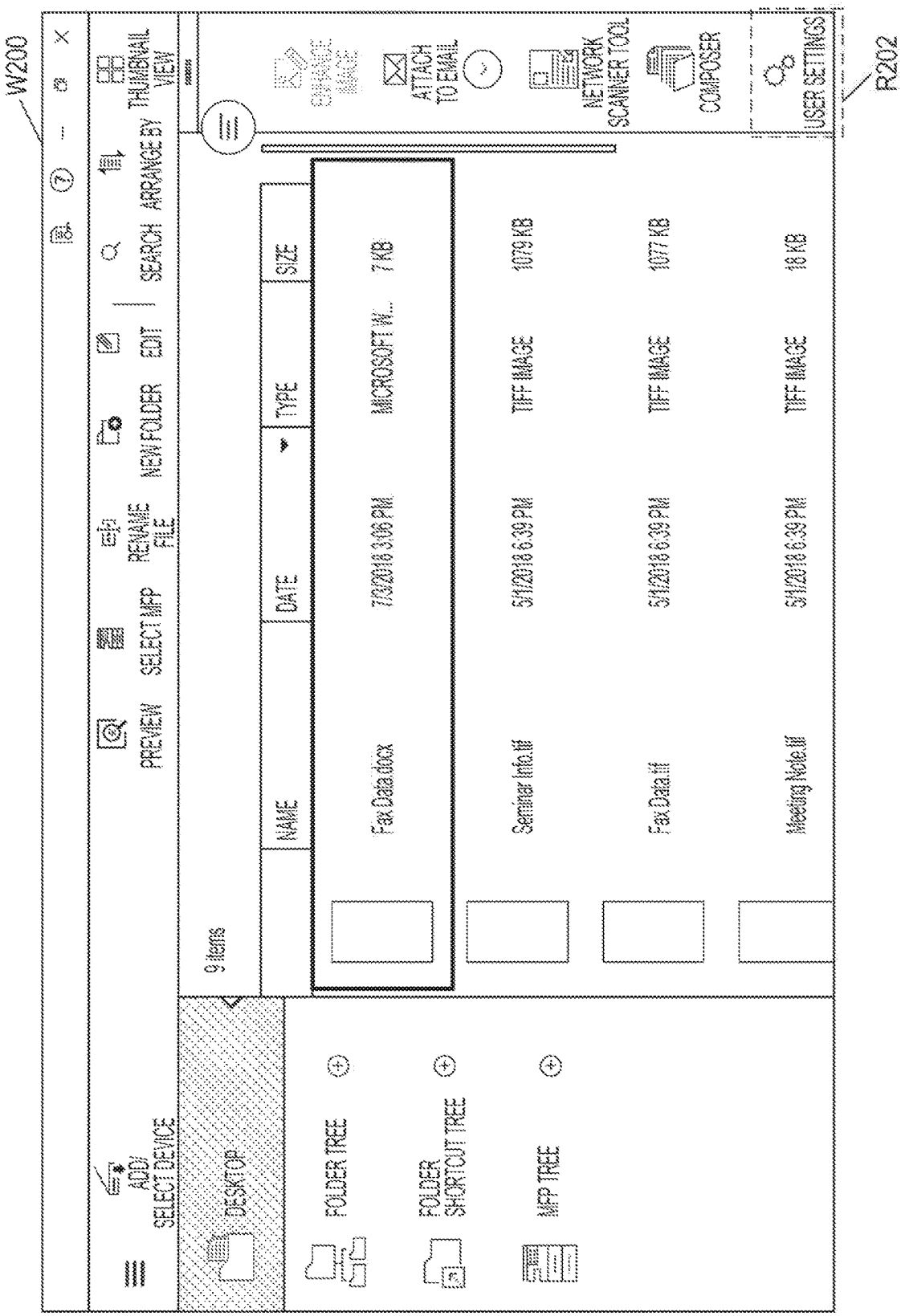
FIG. 8A is a diagram illustrating an example operation (example screen) according to the second embodiment.
Figure 8B:
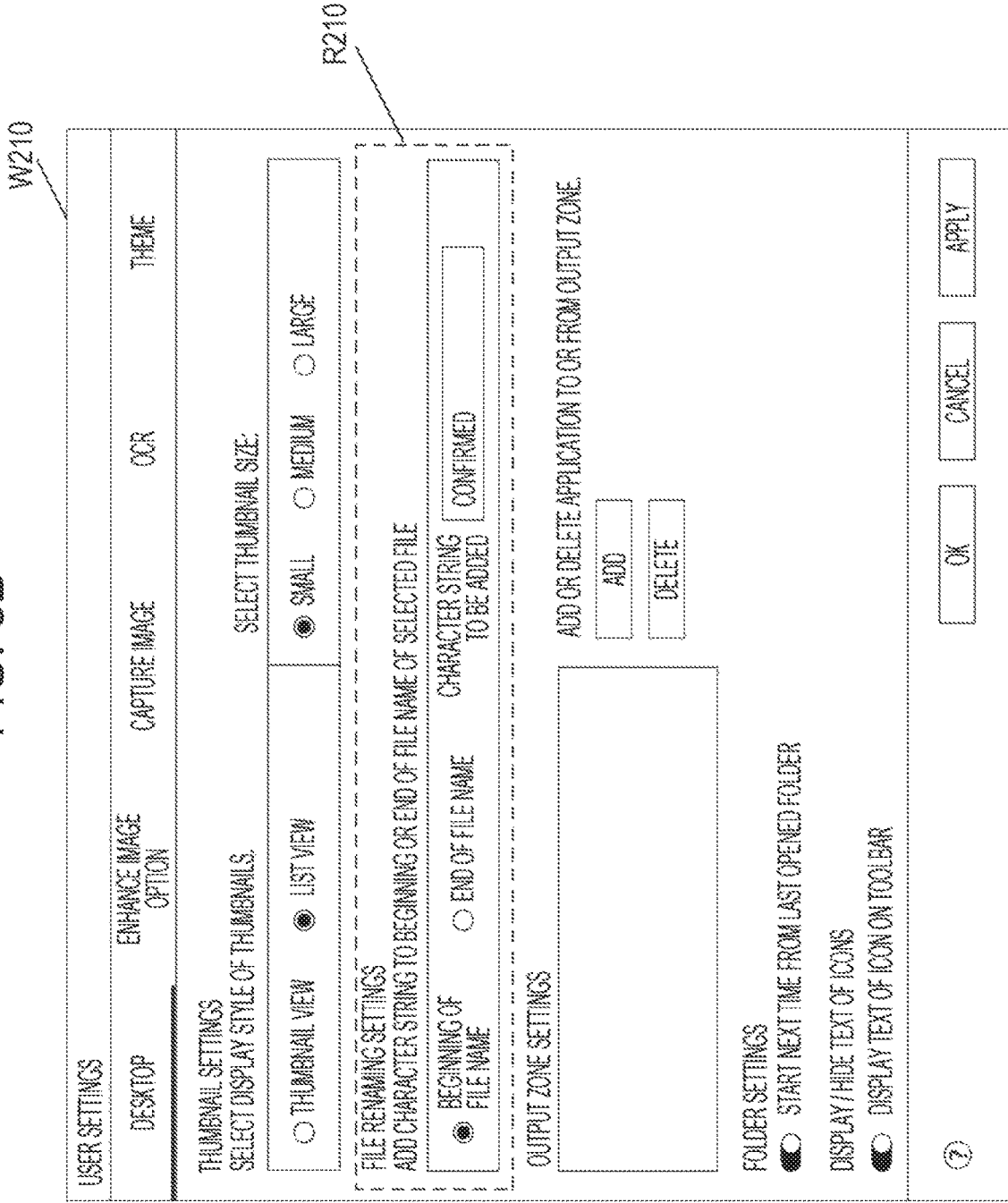
FIG. 8B is a diagram illustrating an example operation (example screen) according to the second embodiment.

FIGS. 8A and 8B illustrate example screens according to this embodiment. On a display screen W200 illustrated in FIG. 8A, a User Settings button is displayed in an operation area R202.

When the User Settings button is selected, a transition to a display screen W210 illustrated in FIG. 8B occurs. The display screen W210 is a screen on which various settings are made. On the display screen W210, thumbnail settings or settings for specifying the display style or the like of the toolbar displayed in the operation area can be made. In addition, additional information can be set in an area R210. The content entered by the user in the area R210 is used to update the additional information.

As described above, according to this embodiment, a user is able to enter or set a desired additional character string and to select the position to which the additional character string is to be added.

3. Third Embodiment

A third embodiment will now be described. The third embodiment is an embodiment in which as additional character string is changed or deleted each time an operation button for the file renaming process is selected. In the third embodiment, the function configuration and the process flow are the same as those in the first embodiment, and a description will be given focusing on the difference from the first embodiment.

In the embodiment described above, when a file renaming process is executed, an additional character string is merely added to a file name. Accordingly, if the "Rename File" operation button is selected twice, an additional character string is added twice.

<Original file name> Order.pdf
<First time>[confirmed]Order.pdf
<Second time>[confirmed][confirmed]Order.pdf In this embodiment, an additional character string is added in a different manner.

First Example

For example, an additional character string has already been added to the beginning (or end) of the target file (selected file) name. In this case, the file name is changed such that a number in parentheses is added after the additional character string without adding any character string.

Figure 9A:
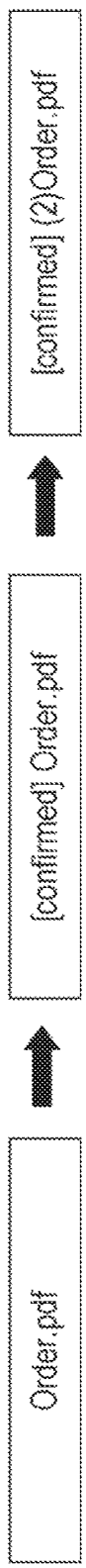
FIG. 9A is a diagram illustrating an example operation according to a third embodiment.

For example, as illustrated in FIG. 9A, the file name is changed to "[confirmed](2) Order.pdf". The user, who sees the changed file name, is able to easily understand the number of times the target file has been conflrmed.

Second Example

For example, an additional character string has already been added to the beginning (or end) of the target file (selected file) name. In this case, the file name is changed such that the additional character string is deleted.

Figure 9B:
FIG. 9B is a diagram illustrating an example operation according to the third embodiment.

For example, as illustrated in FIG. 9B, the control unit 100 changes the file name "[confirmed]Order.pdf" to the original file name before the additional character string is added, that is, "Order.pdf".

A user is able to easily add and remove or delete an additional character string by selecting the "Rename File" operation button.

Third Example

For example, an additional character string is set so as to be changed from one to another. For example, an additional character string is set to a first additional character string "under confirmation", a second additional character string "confirmed", and a third additional character string "rejected".

Figure 9C:
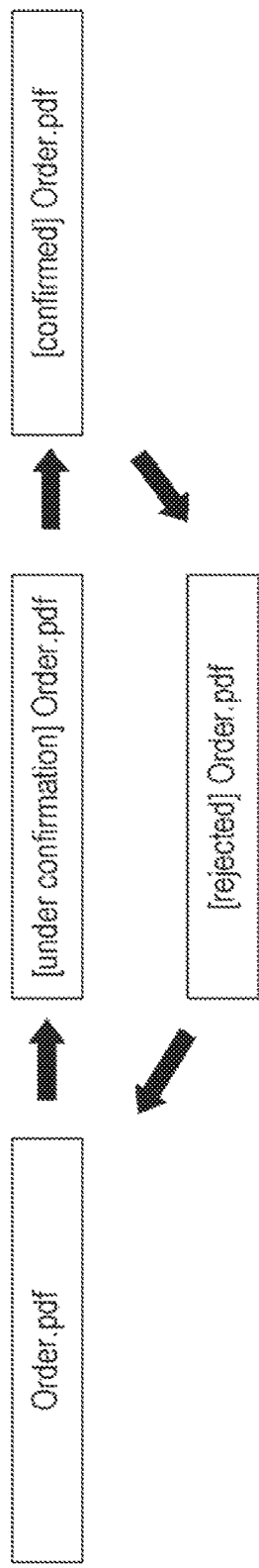
FIG. 9C is a diagram illustrating an example operation according to the third embodiment.
Figure 9D:
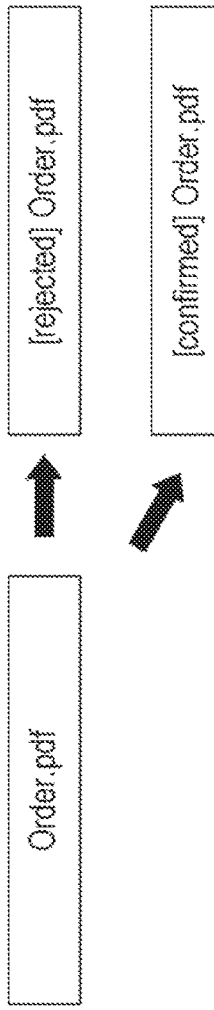
FIG. 9D is a diagram illustrating an example operation according to the third embodiment.

When as additional character string has already been added to the beginning (or end) of the target file (selected file) name, the file name is changed such that the additional character string is changed to the next additional character string. For example, as illustrated in FIG. 9C, a user repeatedly selects the "Rename File" operation button, thereby changing the file name to different ones. Finally, the additional character string may be deleted (or erased).

As described above, a user is able to switch among a plurality of additional character strings with a single operation and add one of them. Thus, the user is able to easily check the current status of the file.

Fourth Example

For example, a plurality of "Rename File" operation buttons may be disposed. For example, a first operation button is assigned the additional character string "rejected". A second operation button is assigned the additional character string "confirmed". As described above, with the use of a plurality of "Rename File" operation buttons, a user is able to rename a file such that the desired additional character string is easily added to the file name.

4. Fourth Embodiment

A fourth embodiment will now be described. The fourth embodiment is an embodiment in which user management is performed. In the fourth embodiment, substantially the same devices, components, and steps as those in the first embodiment are assigned the same numerals and will not be described, and a description will be given focusing on the difference from the first embodiment.

4.1 Overall System Configuration

Figure 10:
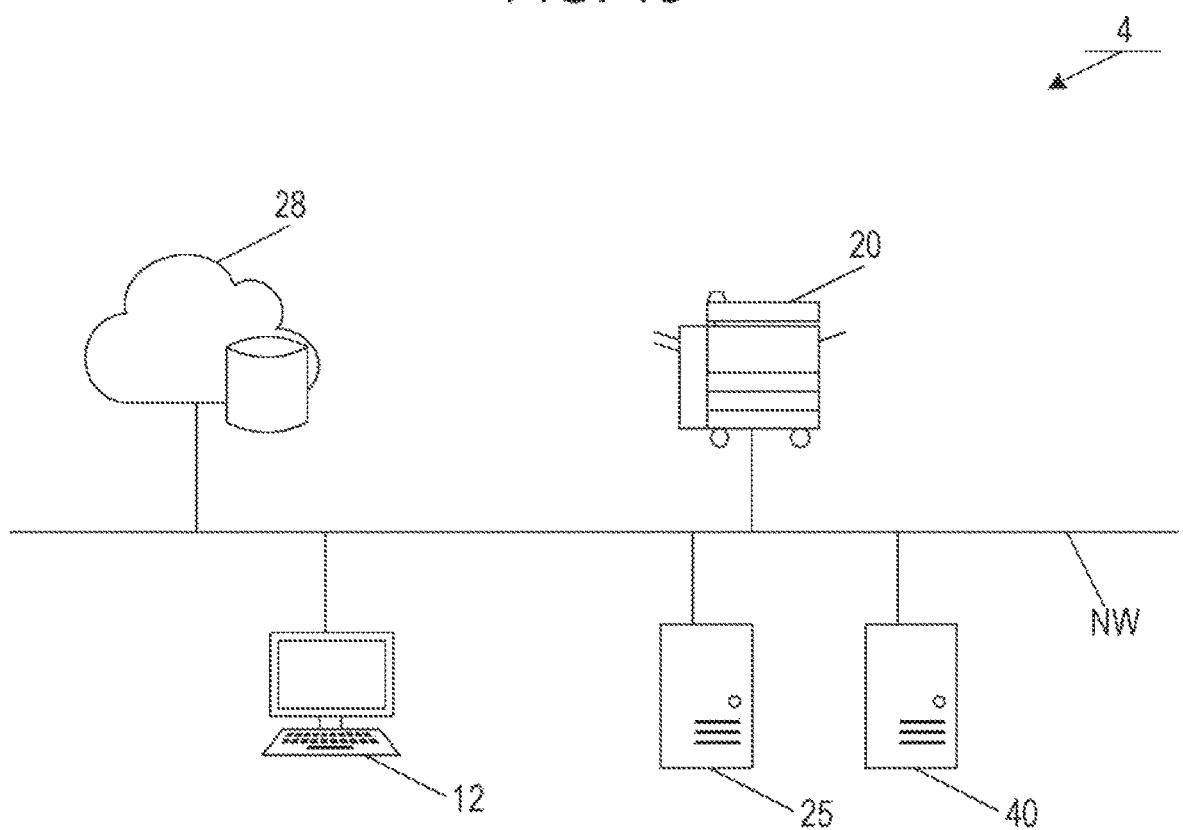
FIG. 10 is a diagram illustrating the overall configuration of a system according to a fourth embodiment.

FIG. 10 is a diagram illustrating the overall configuration of a system 4 according to the fourth embodiment. In the system 4, unlike the system 1, a user management server 40 is further connected to the network NW. Further, a terminal device 12 is connected in place of the terminal device 10 in the system 1.

4.2 Function Configuration

Figure 11:
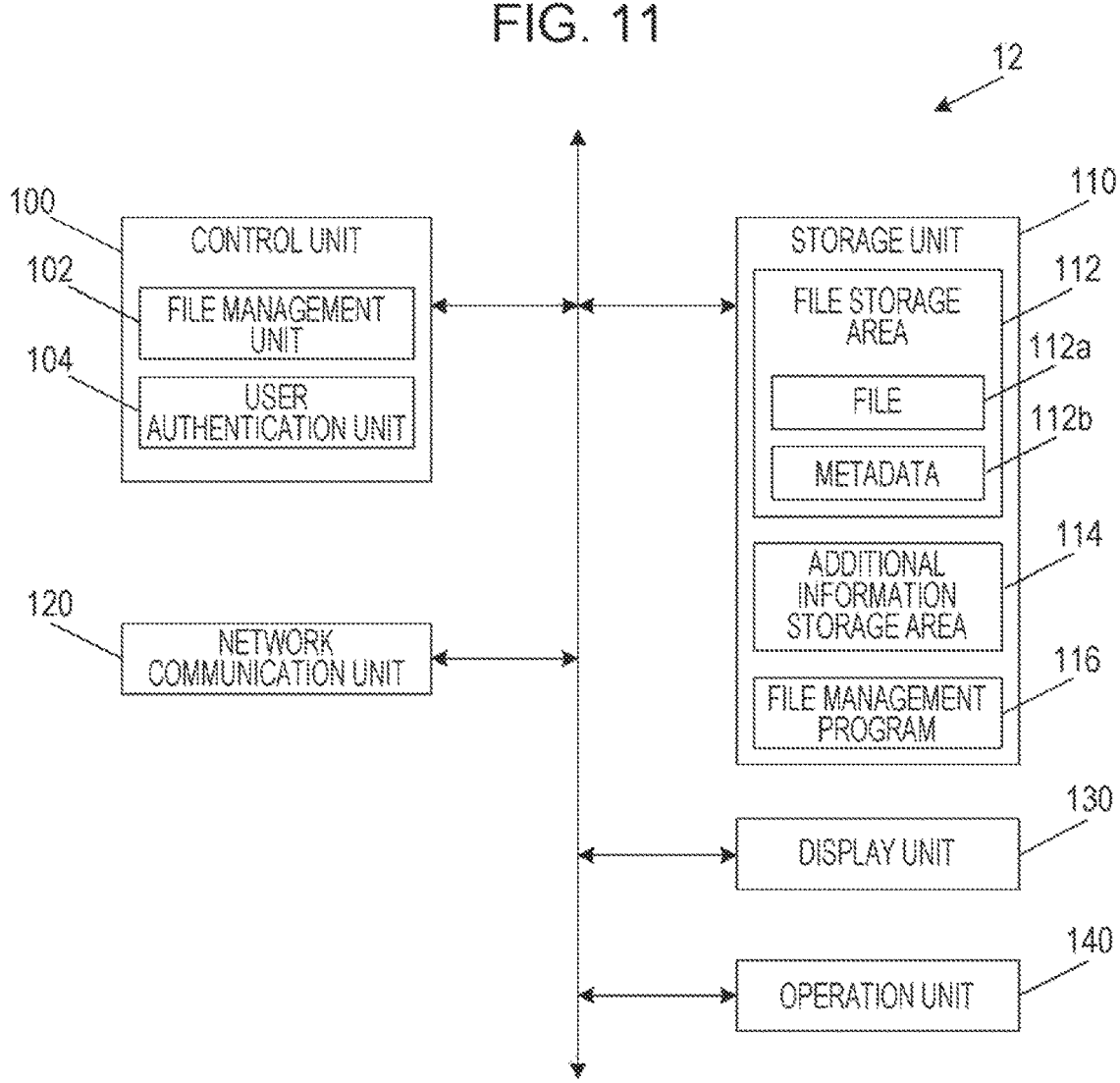
FIG. 11 is a diagram illustrating the configuration of a terminal device according to the fourth embodiment.

FIG. 11 is a diagram illustrating the function configuration of the terminal device 12. In the terminal device 12, the control unit 100 functions as the file management unit 102 and a user authentication unit 104.

The user authentication unit 104 performs user authentication. For example, the user authentication unit 104 authenticates a user when the user logs in to the terminal device 12 or authenticates a user when the user executes the file management program 116 (file management system) with the file management unit 102.

In a method for authenticating a user, for example, the user authentication unit 104 performs user authentication by using the user management server 40 on the basis of a user ID and password entered by the user. Thus, a user currently using the terminal device 12 can be authenticated. User authentication may be performed at an appropriate timing.

Specifically, user authentication is performed when the terminal device 12 is started (such as at the time of turning power on or at the time of login to an operating system (OS)), when the file management program 116 is executed, or when the file management system is used. Alternatively, user authentication may be performed at the time of access to a shared folder on a network or at the time of login to a cloud service. The user authentication unit 104 may perform user authentication on the terminal device 12 or using a user authentication server (e.g., the user management server 40). Alternatively, the user authentication unit 104 may utilize authentication using an external service (such as OAuth authentication).

The content of the file storage area 112 in the terminal device 12 is illustrated. That is, the file storage area 112 stores a file 112a and metadata 112b.

The metadata 112b is data associated with the file 112a, and includes information on a user who has added an additional character string.

Figure 12:
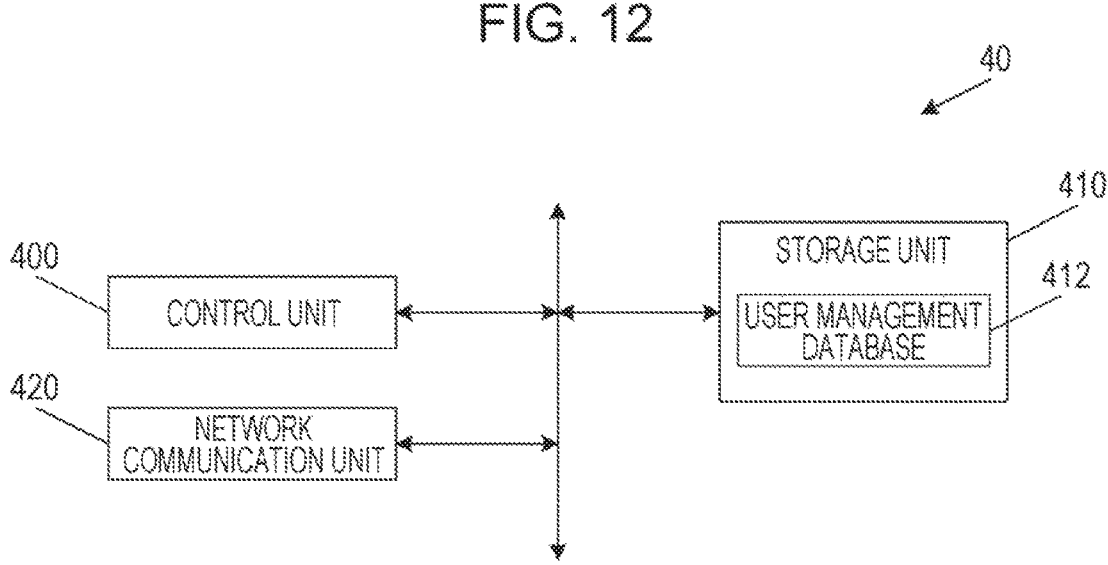
FIG. 12 is a diagram illustrating the configuration of a user management server according to the fourth embodiment.

FIG. 12 is a diagram illustrating the function configuration of the user management server 40. The user management server 40 includes a control unit 400, a storage unit 410, and a network communication unit 420.

The control unit 400 controls the overall operation of the user management server 40. The control unit 400 reads and executes various programs stored in the storage unit 410 to implement various functions. The control unit 400 is constituted by one or more arithmetic units (e.g., CPUs).

The storage unit 410 is a function unit that stores various programs used for the operation of the user management server 40, and various data. The storage unit 410 is constituted by, for example, an SSD that is a semiconductor memory, an HDD that is a magnetic disk, or the like. Alternatively, the storage unit 410 may be a USB connected external storage device or a network-accessible cloud area, for example.

Further, the storage unit 410 stores a user management database (DB) 412. The user management DB 412 is a DB that manages information concerning users. For example, when the user management DB 412 is accessed from the terminal device 12 or the like, the current user can be authenticated.

The user management DB 412 also manages privileges that can be granted to the users. For example, the user management DB 412 manages, for each user, the ability to rename a file.

The network communication unit 120 communicates with another device, the multifunction peripheral 20, or a server device via the network NW. The network NW may be a wired or wireless network. The network communication unit 120 may be connected to an access point using a WLAN and may be connected to the network NW. In this embodiment, a typical LAN is described as an example. Alternatively, WAN technologies such as LTE, 4G, and 5G may be used.

4.3 Process Flow

Figure 13:
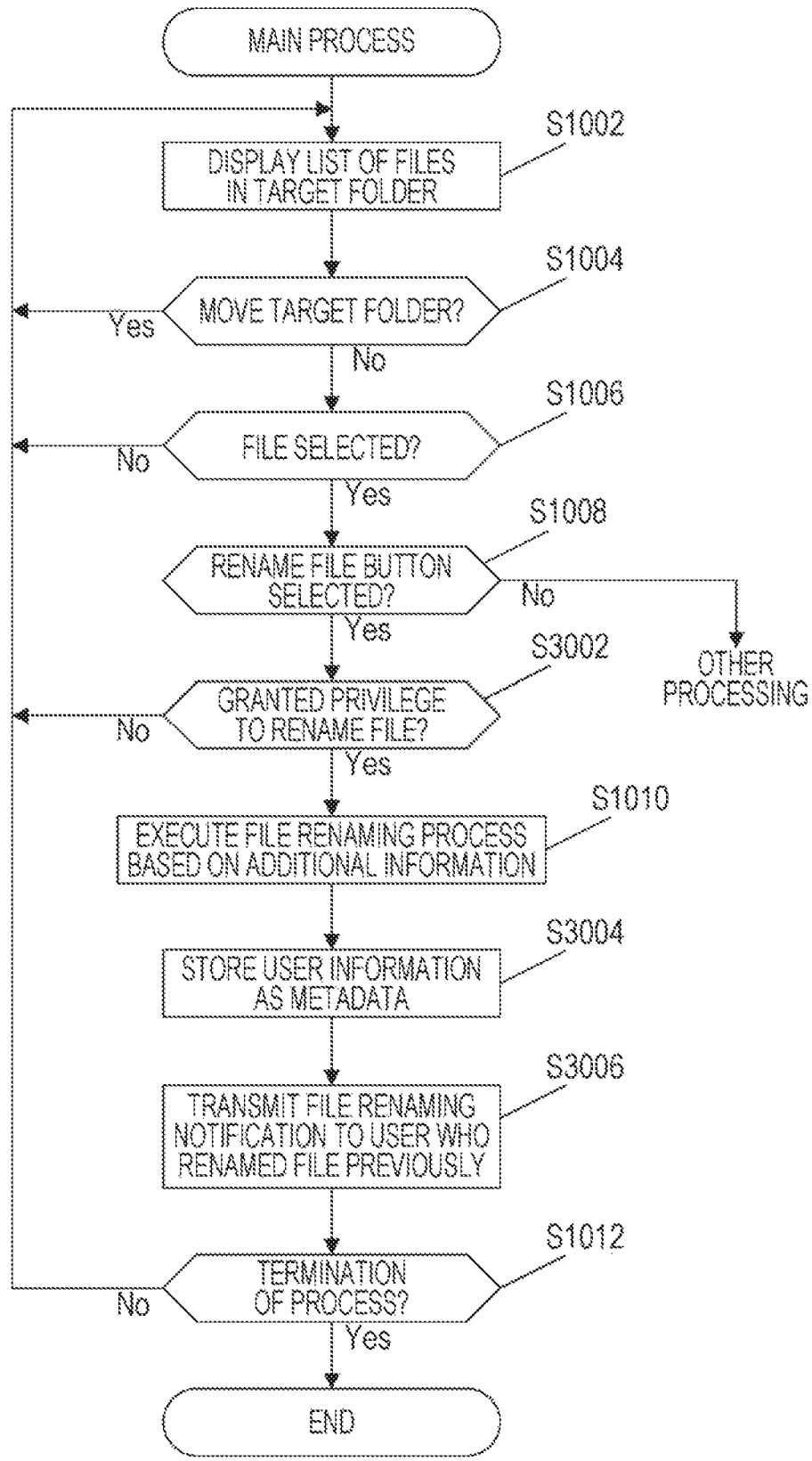
FIG. 13 is a flowchart illustrating an operation of a main process according to the fourth embodiment.

A process flow according to this embodiment will be described with reference to FIG. 13. FIG. 13 is a diagram illustrating a process flow that replaces the process flow according to the first embodiment illustrated in FIG. 4. Substantially the same steps are assigned the same numerals, and will not be described.

When a user selects a file and selects the Rename File button (steps S1002 to S1006 and step S1008: Yes), the control unit 100 determines whether the current user has a privilege to rename the file (step S3002).

Examples of the method for determining whether a user has a privilege to rename a file include the following methods.

First Method

For example, the control unit 100 refers to the user management DB 412 and determines whether the login user of the terminal device 12 or the login user of the file management system has the privilege. In this case, the control unit 100 may access the user management server 40 each time the determination is made, or each user may be granted a privilege at the time of login and the terminal device 12 may manage granting privileges. That is, for each user, the ability to rename a file is managed.

Second Method

For each folder or file, permission of renaming the file or files is determined. For example, a folder or a file is selected, and a user or user group who is allowed to rename the file or files is designated. Accordingly, users allowed to rename files are managed.

Third Method

For each file, it is determined whether a user has a privilege to rename the file. For example, when the multifunction peripheral 20 scans a file or receives a file via fax, information on a user having a privilege to rename the file is added to metadata of the file. In this case, the multifunction peripheral 20 refers to the user management server 40, obtains information on a user allowed to rename the file, and stores the information as metadata.

Figure 14:
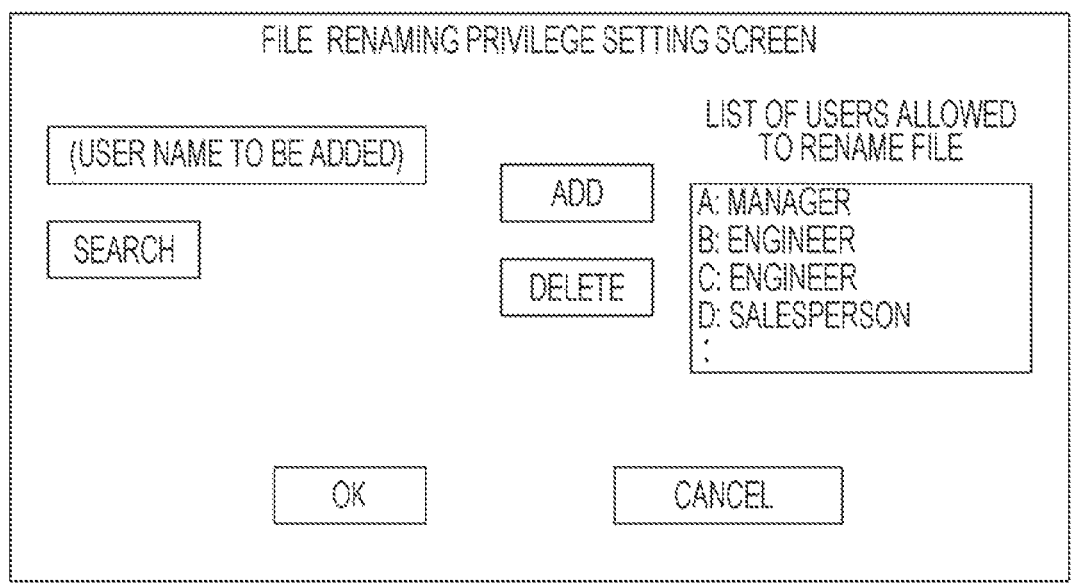
FIG. 14 is a diagram illustrating an example operation (example screen) according to the fourth embodiment.

The privilege to rename a file may be set by a user or an administrator. For example, as illustrated in FIG. 14, a file renaming privilege setting screen may be used to manage users allowed to rename a file.

Referring back to FIG. 13, if the user has the privilege to rename the file (step S3002: Yes), the control unit 100 executes a file renaming process based on additional information (step S1010).

Further, information on a user who has renamed the file is stored as metadata (meta-information) associated with the renamed file (step S3004). If user information has already been stored as metadata (e.g., if information on a user who last renamed the file is stored), the control unit 100 notifies a person of the renaming of the file on the basis of the user information (step S3006).

While a person is notified on the basis of user information stored as metadata, any other person, such as the author of the file or the owner of the file, may be notified.

Examples of the method by which a user is notified of the renaming of a file include sending an email, displaying a message, and presenting a pop-up window.

The case of sending an email will be described as a specific example. For example, in response to renaming of a file, a mail application is started. Then, the file is attached to a new email message on a new email sending screen. The destination address or the like may be entered by a user, or may be entered based on user information obtained from the user management server 40.

As described above, according to this embodiment, it is possible to manage, for each user, the ability to rename a file. In addition, when a file is renamed, it is possible to notify another user of the renaming of the file. A plurality of users may be notified of the renaming of the file. A user who has renamed the file may also be notified of the renaming of the file.

Alternatively, a user associated by the user management server 40 may be notified of the renaming of the file. For example, a supervisor or a person with decision making authority may be notified of the renaming of the file in the workflow.

In the embodiment described above, two processes have been described successively. Alternatively, one of the processes may be performed. For example, only the process for determining whether the privilege of renaming a file is granted using user management may be performed. In this case, the processing or step S3006 is not executed.

Alternatively, only the process for notifying a user of renaming of a file may be performed. In this case, the processing of step S3002 is not executed (i.e., as in the first embodiment, a file can be renamed).

5. Fifth Embodiment

A fifth embodiment will now be described. The fifth embodiment is an embodiment in which a setting dialog is invoked and an additional character string can be selected or an additional character string can be edited with a simple operation. In the fifth embodiment, substantially the same devices, components, and steps as those in the first embodiment are assigned the same numerals and will not be described, and a description will be given focusing on the difference from the first embodiment.

5.1 Main Process

Figure 15:
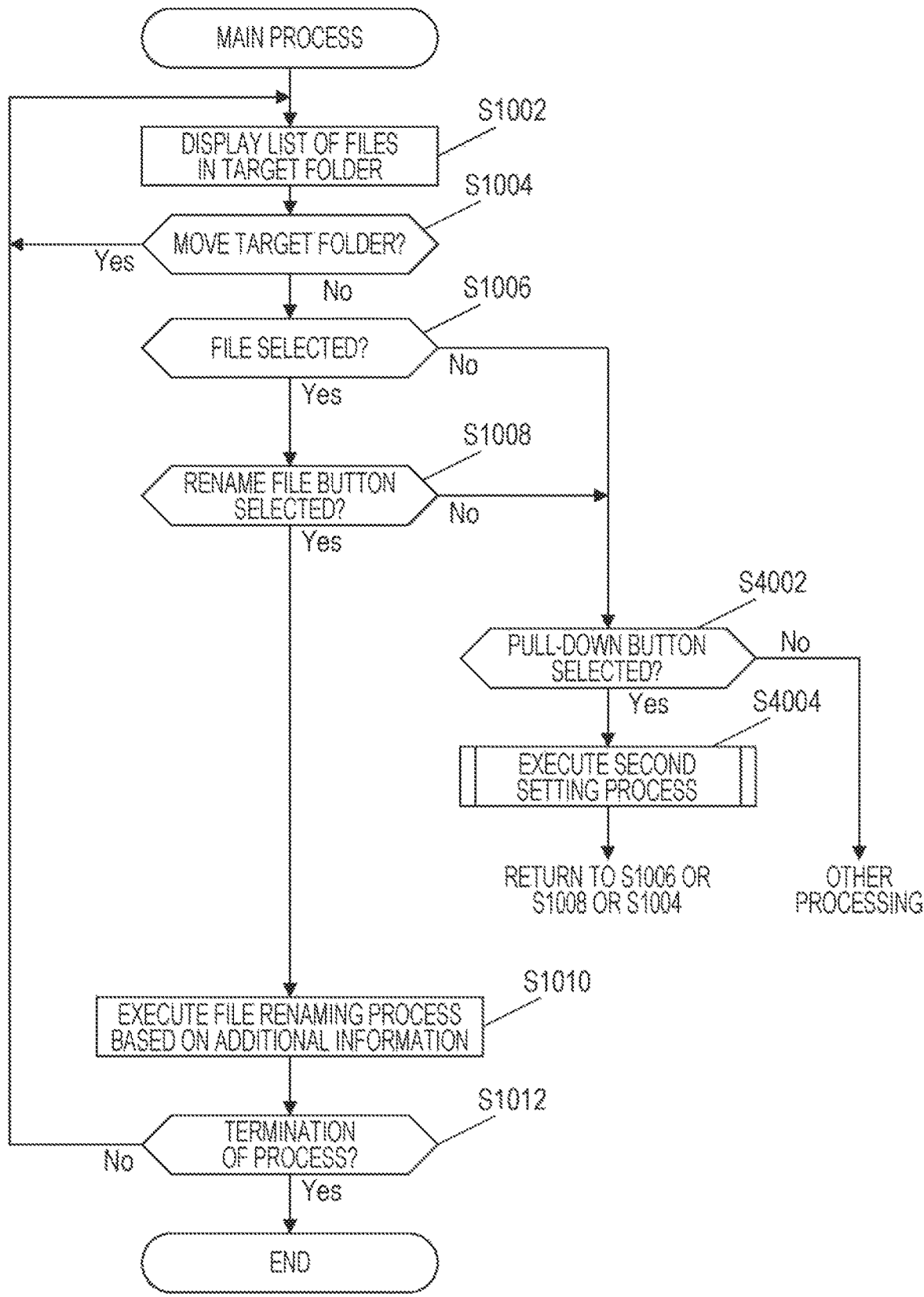
FIG. 15 is a flowchart illustrating an operation of a main process according to a fifth embodiment.

A process flow according to this embodiment will be described with reference to FIG. 15. FIG. 15 is a diagram illustrating a process flow that replaces the process flow according to the first embodiment illustrated in FIG. 4. Substantially the same steps are assigned the same numerals, and will not be described.

When files in the target folder to be processed by a user are displayed as a list (step S1002→step S1004: No), the control unit 100 determines whether a pull-down has been selected (step S1006: No→step S4002, or step S1008: No→step S4002).

The term "pull-down", as used here, refers to a button or an area used to display a dialog on a display screen to execute a process such as selecting or changing an additional character string. In this embodiment, a button for a pull-down view (pull-down button) is di played next to the Rename File button. However, any other display style may be used.

Specifically, the button for a pull-down view operates as a designation button used to designate an additional character string. Desirably, the button for a pull-down view and the Rename File button among the operation buttons are associated with each other and are integrated into a designation button. The display of the designation button allows the user to intuitively understand the meaning of the pull-down button, which is the designation button. However, the button for a pull-down view may be displayed in any other area as an operation button, or a different operation such as pressing and holding or double clicking (or double tapping) the Rename File button may be performed to perform the same operation as that when the button for a pull-down view is selected.

In this embodiment, when the pull-down button is selected (step S4002: Yes), the control unit 100 (the file management unit 102) executes a second setting process (step S4004). When the pull-down button is not selected (step S4002: No), the control unit 100 executes other processing, or after the second setting process is executed (step S4004), the control unit 100 returns to the process described above. The control unit 100 executes appropriate processing.

For example, if the pull-down button is selected in the state where no file is selected, the file management unit 102 may execute the processing of step S1006 again. If the pull-down button is selected in the state where a file is selected, the file management unit 102 may return to step S1008. Alternatively, the file management unit 102 may execute the process again from step S1004.

That is, when the pull-down button is selected, the control unit 100 executes the second setting process as interrupt processing and, after the completion of the second setting process, returns to and executes the usual process.

5.2 Second Setting Process (First Example Process)

Figure 16:
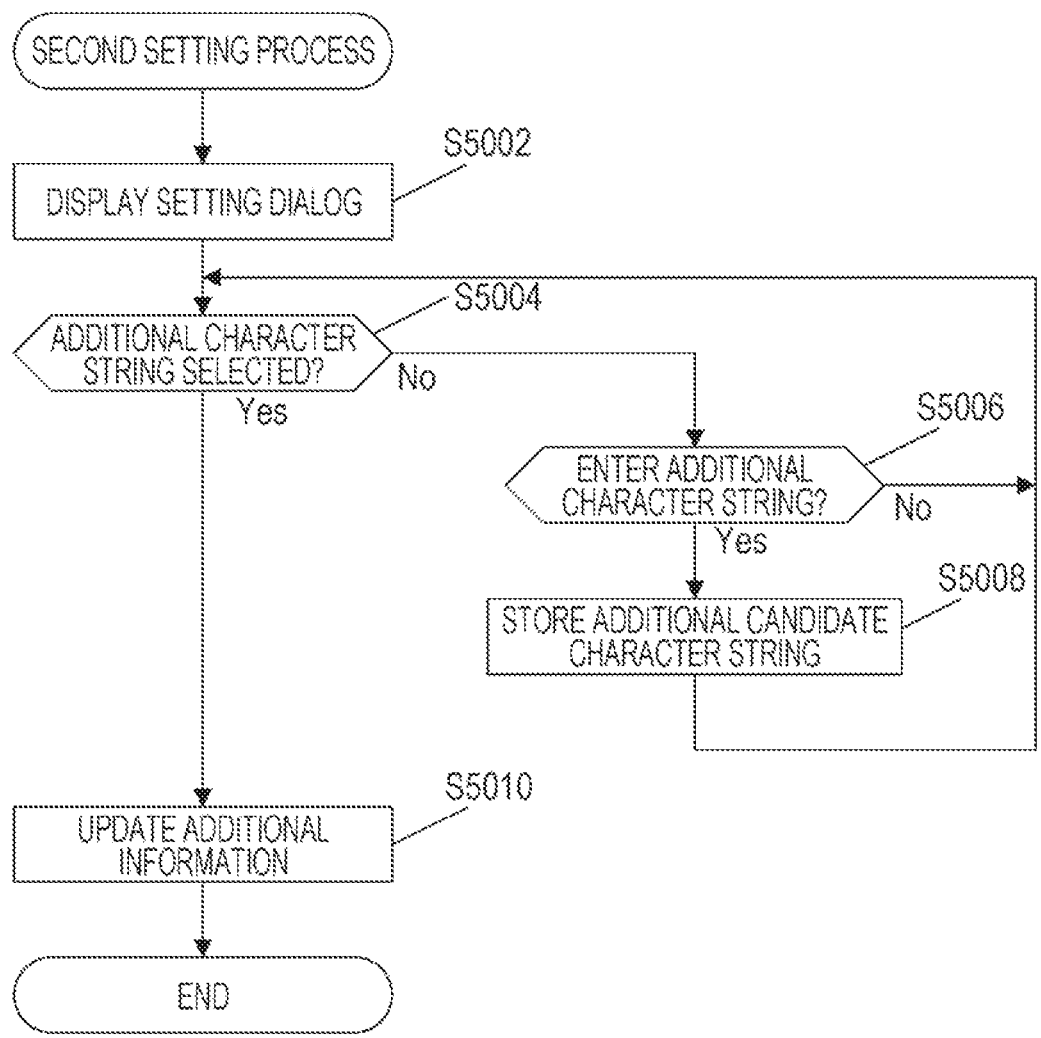
FIG. 16 is a flowchart illustrating an operation of a second setting process according to the fifth embodiment.

The second setting process executed by the file management unit 102 in step S4004 illustrated in FIG. 15 will be described with reference to the drawings. FIG. 16 illustrates the operation flow of the second setting process, and FIGS. 17A, 17B, 18A, and 18B are diagrams illustrating example operations. In the second setting process, as in the first setting process, additional information is updated. Thus, in the second setting process, steps described in the first setting process (e.g., the position at which an additional character string is to be added) will not be described, and a description will be given focusing on the difference from the first setting process.

Step S5002

First, when the pull-down button is selected, the file management unit 102 displays a setting dialog on the display unit 130 (step S5002). The setting dialog will be described with reference to an example of a display screen W500 illustrated in FIG. 17A.

On the display screen W500, a pull-down button B502 is displayed next to a Rename File button B500. When the pull-down button B502 is selected, a pull-down menu M500 is displayed near the pull-down button B502 (on the display screen W500, below the Rename File button B500 and/or the pull-down button B502, for example).

The pull-down menu M500 shows one or more additional candidate character strings as options of an additional character string. The additional candidate character string or strings are each a candidate selected as an additional character string and may be stored in the system in advance or stored and updated by a user.

Alternatively, a number of additional candidate character strings equal to a predetermined upper limit (such as three, five, or ten) may be stored. This number may be equal to the number of additional candidate character strings that can be d splayed in the pull-down menu as a list or may be equal to the number of additional candidate character strings that can be displayed through scrolling.

The additional candidate character string or strings may be stored in an additional candidate character string storage area disposed in the storage unit 110 or may be temporarily stored in the storage unit 110. For example, an additional candidate character string table or an additional candidate character string file may be generated, or an additional candidate character string may be stored as a set value (e.g., a registry value) in the system. Alternatively, the additional candidate character string or strings may be stored in an external server or on the cloud.

Step S5004

Referring back to FIG. 16, when a user selects an additional character string from among the additional candidate character string(s) displayed in the setting dialog (step S5004: Yes), the additional information is updated based on the selected additional character string (step S5010).

The operation of selecting an additional character string will be described with reference to a display screen W510 illustrated in FIG. 17B. A user selects "rejected" as an additional character string (area R510) from among the additional candidate character strings in the dialog menu displayed on the display screen W510.

Then, when the user selects an OK button B510, the additional information is updated so as to add "rejected" as an additional character string. That is, in FIG. 17B, when the Rename File button B500 is selected after the OK button B510 is selected, the character string "rejected" is added to the file name. As in the embodiment described above, when the character string "rejected" is added, a delimiter may also be inserted or a character string for identifying the additional character string may also be added.

Figure 17A:
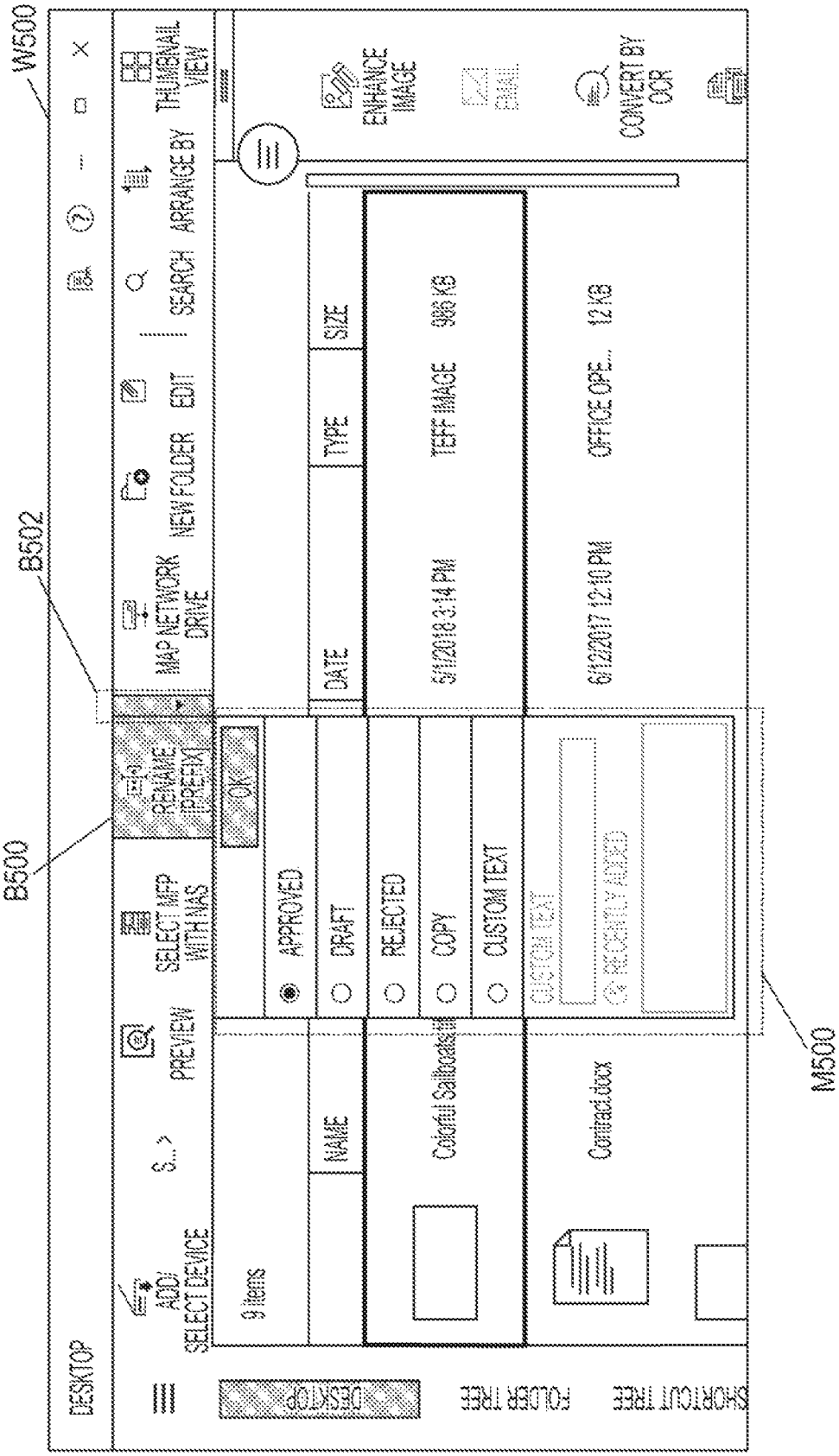
FIG. 17A is a diagram illustrating an example operation (example screen) according to the fifth embodiment.
Figure 17B:
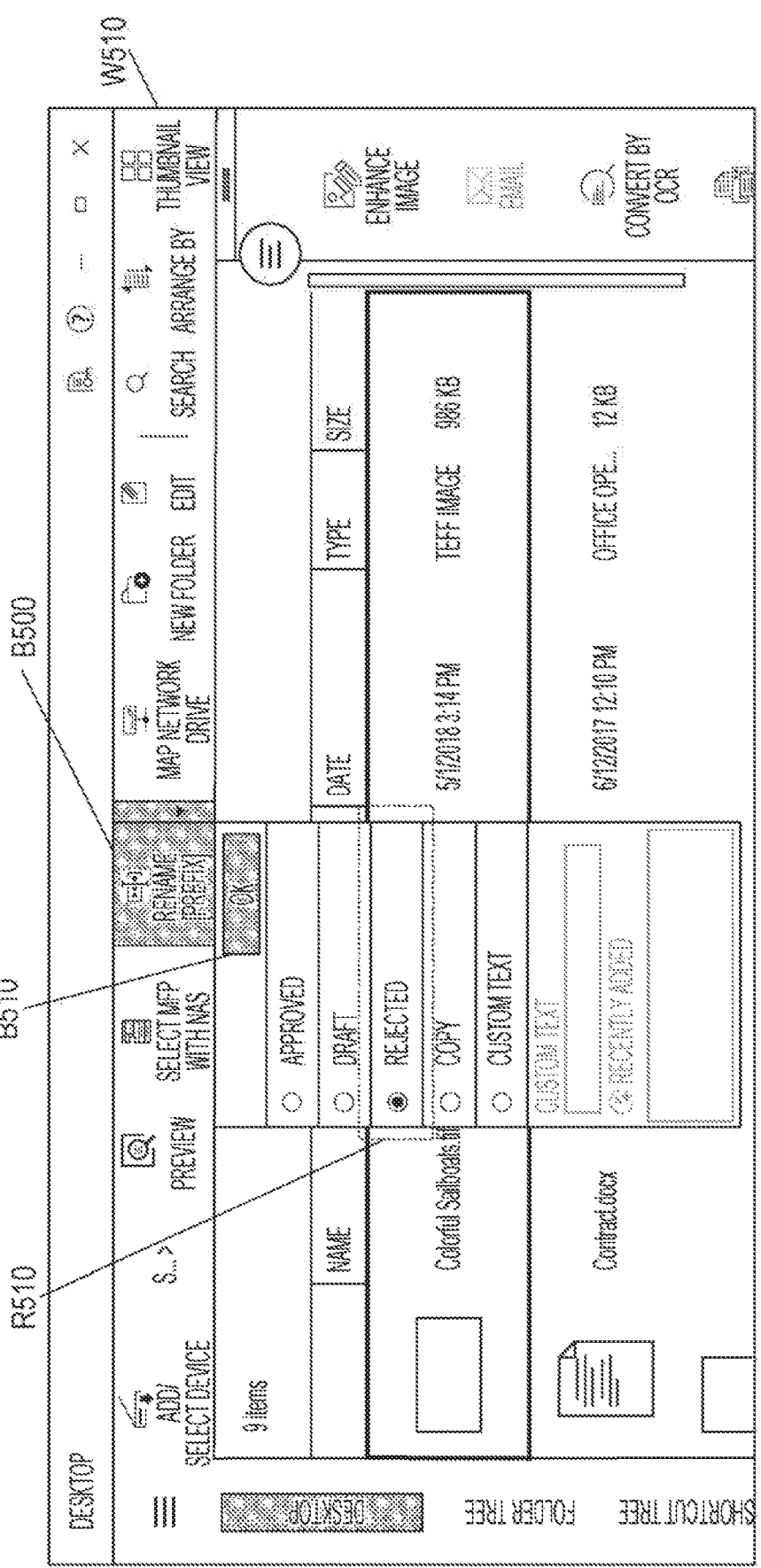
FIG. 17B is a diagram illustrating an example operation (example screen) according to the fifth embodiment.

When a portion other than the dialog menu displayed on the display screen W500 or W510 illustrated in FIG. 17A or 17B is selected, the control unit 100 may close the dialog menu. That is, the second setting process may be stopped.

Steps S5006 and S5008

When a process for entering an additional character string is selected without selecting any additional character string (step S5004: No→step S5006: Yes) the file management unit 102 accepts input of an additional candidate character string and stores the input additional candidate character string (step S5008).

Figure 18A:
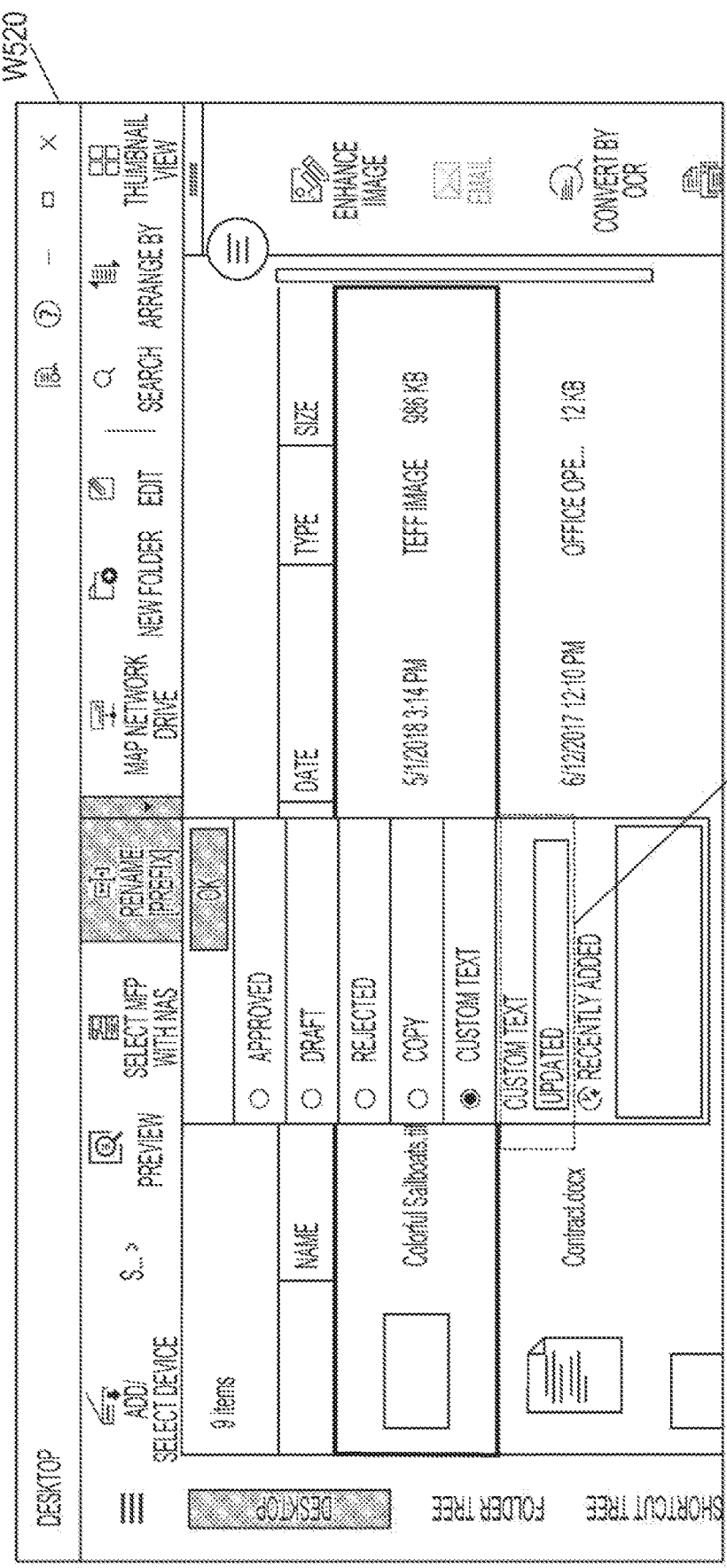
FIG. 18A is a diagram illustrating an example operation (example screen) according to the fifth embodiment.
Figure 18B:
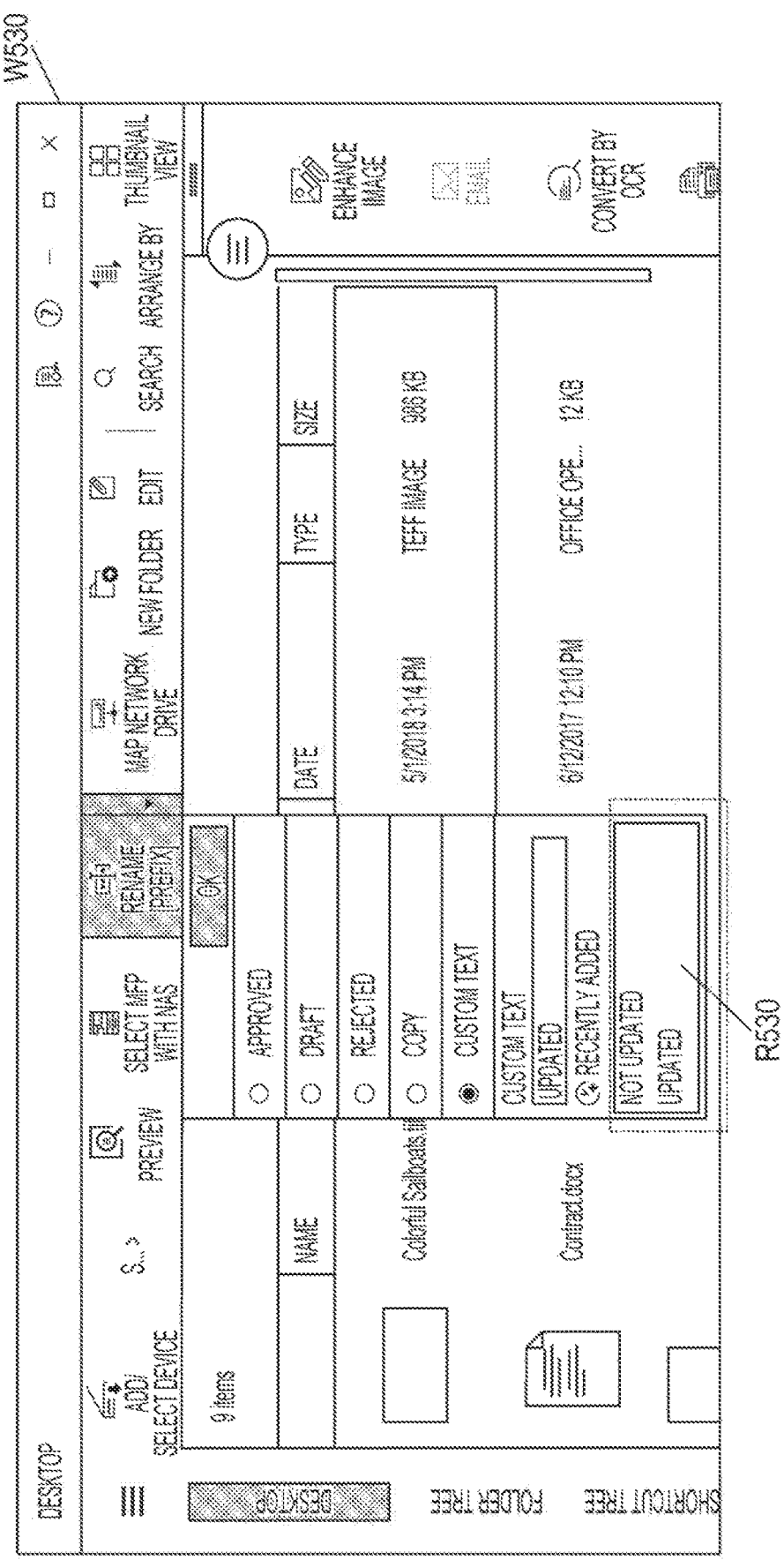
FIG. 18B is a diagram illustrating an example operation (example screen) according to the fifth embodiment.

In an example of a display screen W520 illustrated in FIG. 18A, a lower area R520 of the dialog menu shows a text box for entering an additional candidate character string. A character string entered in the text box by the user is stored as an additional candidate character string.

In the dialog menu, any recently entered additional candidate character string may also be displayed and may be available as an option. For example, on a display screen W530 illustrated in FIG. 18B, a list of recently entered additional candidate character strings is displayed in an area R530. Several (e.g., three or five) most recently entered additional candidate character strings may be displayed as a list, or frequently used additional candidate character strings may be displayed as a list.

When the upper limit is exceeded, no further additional candidate character string may be added, or additional candidate character strings may be deleted from the oldest additional candidate character string. Additionally, an additional candidate character string that is not to be deleted may be protected, and additional candidate character strings other than the protected additional candidate character string may be deleted. Alternatively, additional candidate character strings added by a user may be deleted.

As described above, according to this embodiment, with the use of additional candidate character strings, a user is able to easily change or add an additional character string.

5.3 Second Setting Process (Second Example Process)

A process for further enabling editing of an additional candidate character string is illustrated as a second setting process illustrated in FIG. 19. The second setting process illustrated in FIG. 19 is different from the second setting process illustrated in FIG. 16, and a description will be given focusing on the difference from the second setting process illustrated in FIG. 16.

The file management unit 102 is capable of editing a selected additional character string (step S5004: Yes→step S5100: Yes→step S5102).

FIGS. 20A to 20C and 21A to 21C are diagrams illustrating the operation in the setting process illustrated in FIG. 19. A display screen W600 illustrated in FIG. 20A displays a dialog menu M600 available to select an additional character string and the position at which the additional character string is to be added.

Figure 20A:
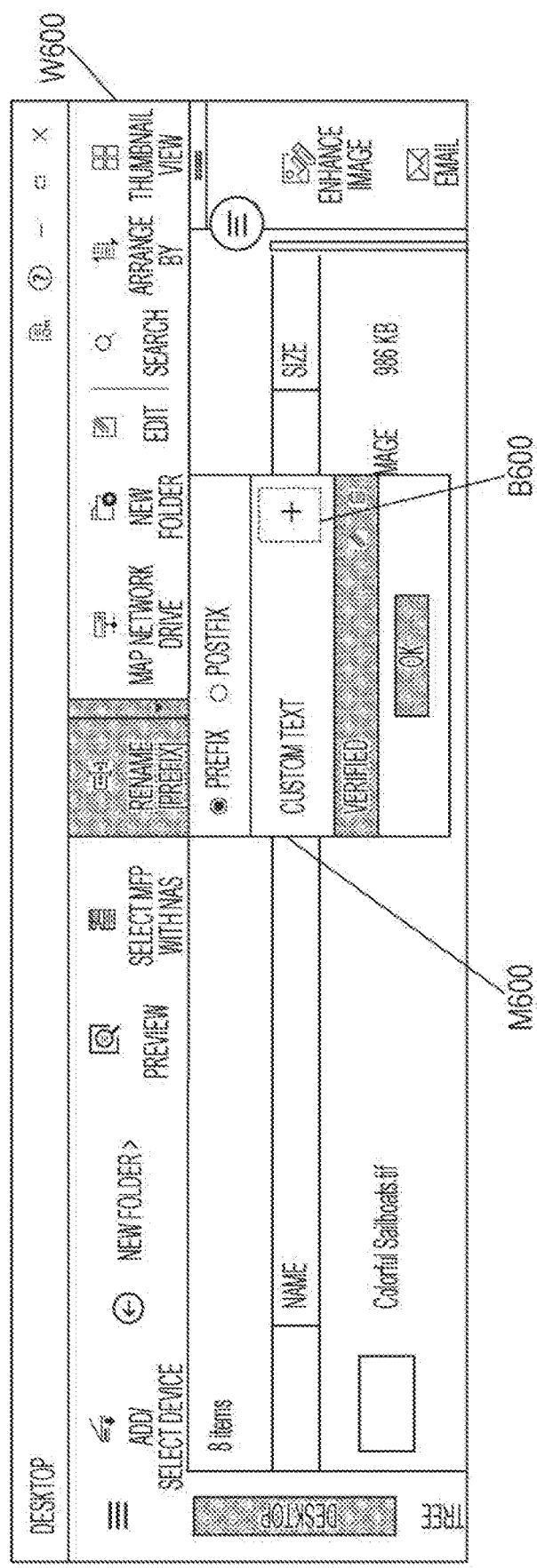
FIG. 20A is a diagram illustrating an example operation (example screen) according to the fifth embodiment.
Figure 20B:
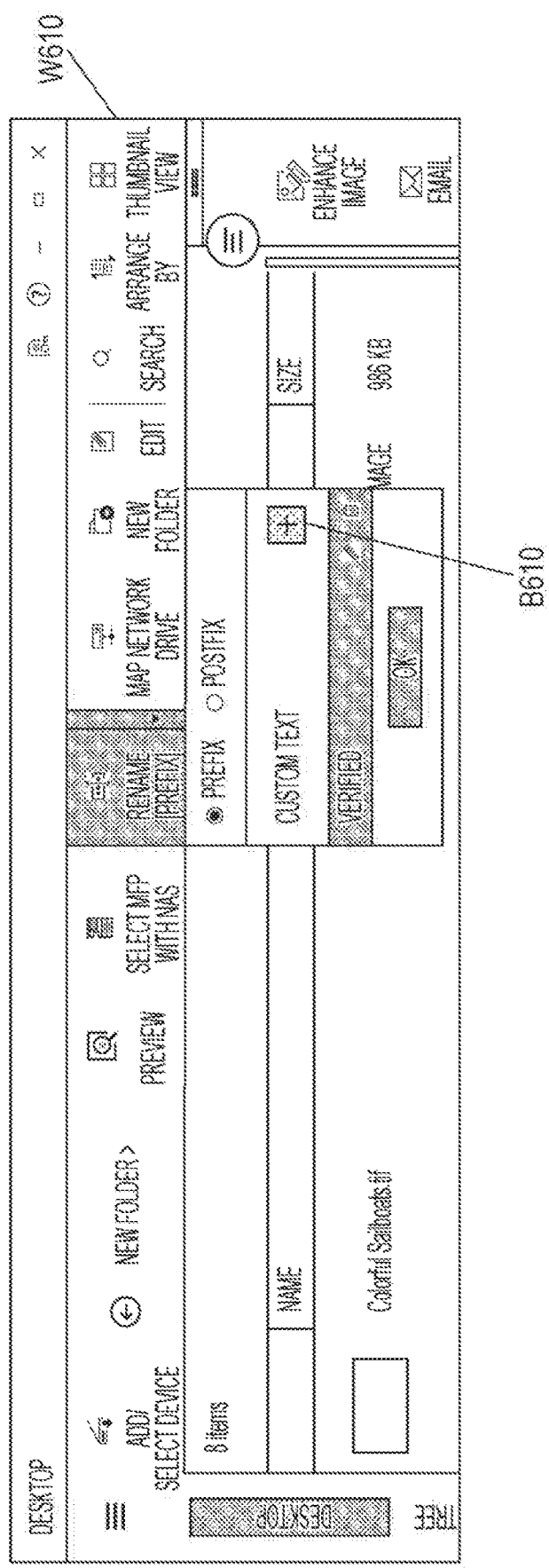
FIG. 20B is a diagram illustrating an example operation (example screen) according to the fifth embodiment.

The display screen W600 displays an Add button B600, which is selected by a user to obtain a display screen W610 illustrated in FIG. 20B. On the display screen W610, an Add button B610 is distinguishably displayed as being selected.

Figure 20C:
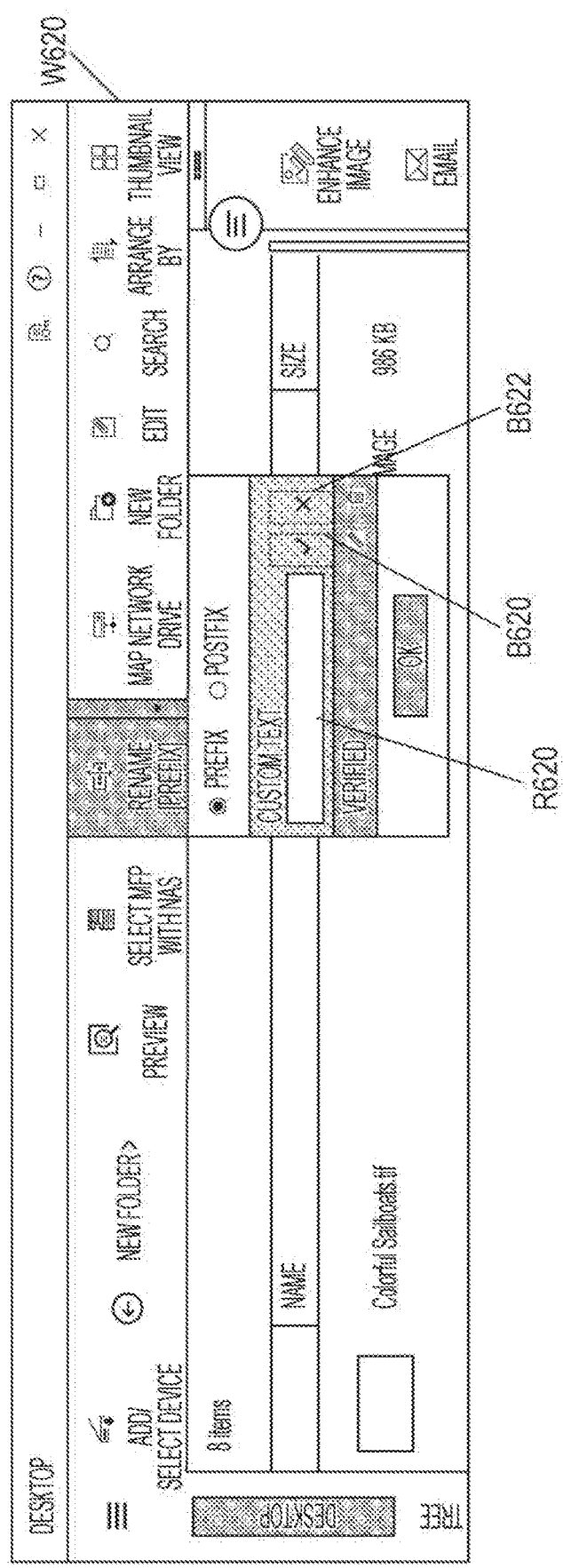
FIG. 20C is a diagram illustrating an example operation (example screen) according to the fifth embodiment.

When a transition to a display screen W620 illustrated in FIG. 20C occurs, the file management unit 102 displays a text box in an area R620 of the dialog menu. When the user enters an additional candidate character string in the text box and selects a button B620, the entered additional candidate character string is stored as an additional character string.

When a Cancel button B622 is selected, the file management unit 102 does not store the additional candidate character string.

Figure 21A:
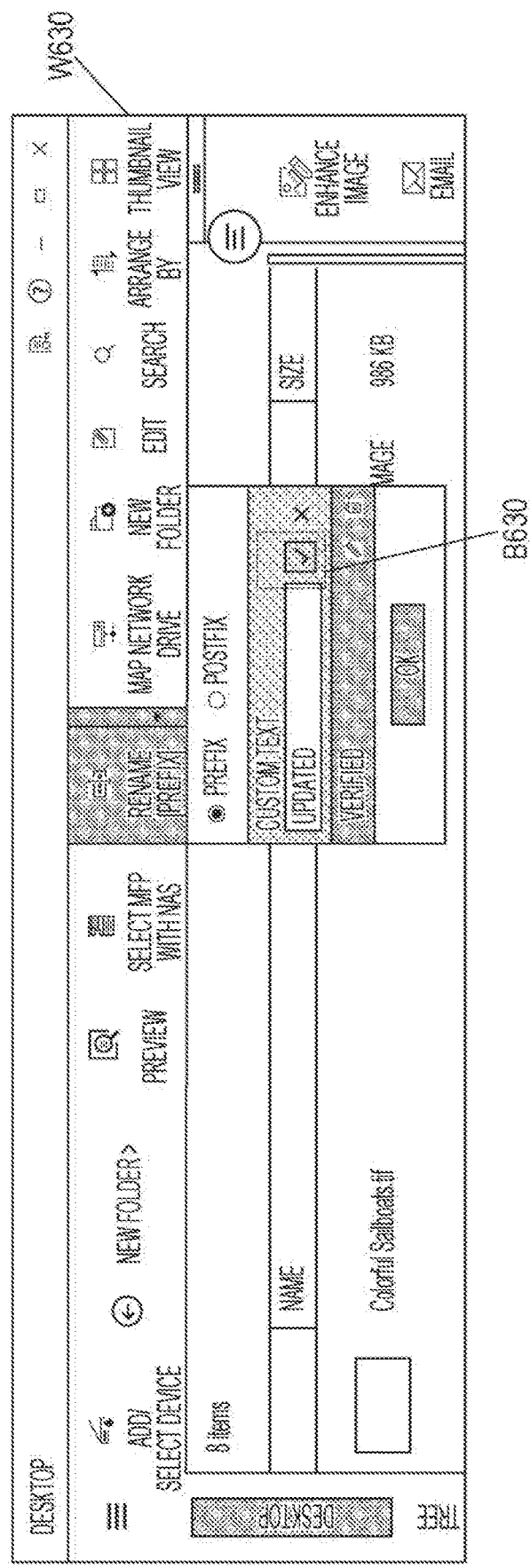
FIG. 21A is a diagram illustrating an example operation (example screen) according to the fifth embodiment.

FIG. 21A illustrates a display screen W630 on which "updated" is entered as an additional candidate character string. When a Set button B630 is selected, a transition to a screen illustrated in FIG. 21B occurs.

Figure 21B:
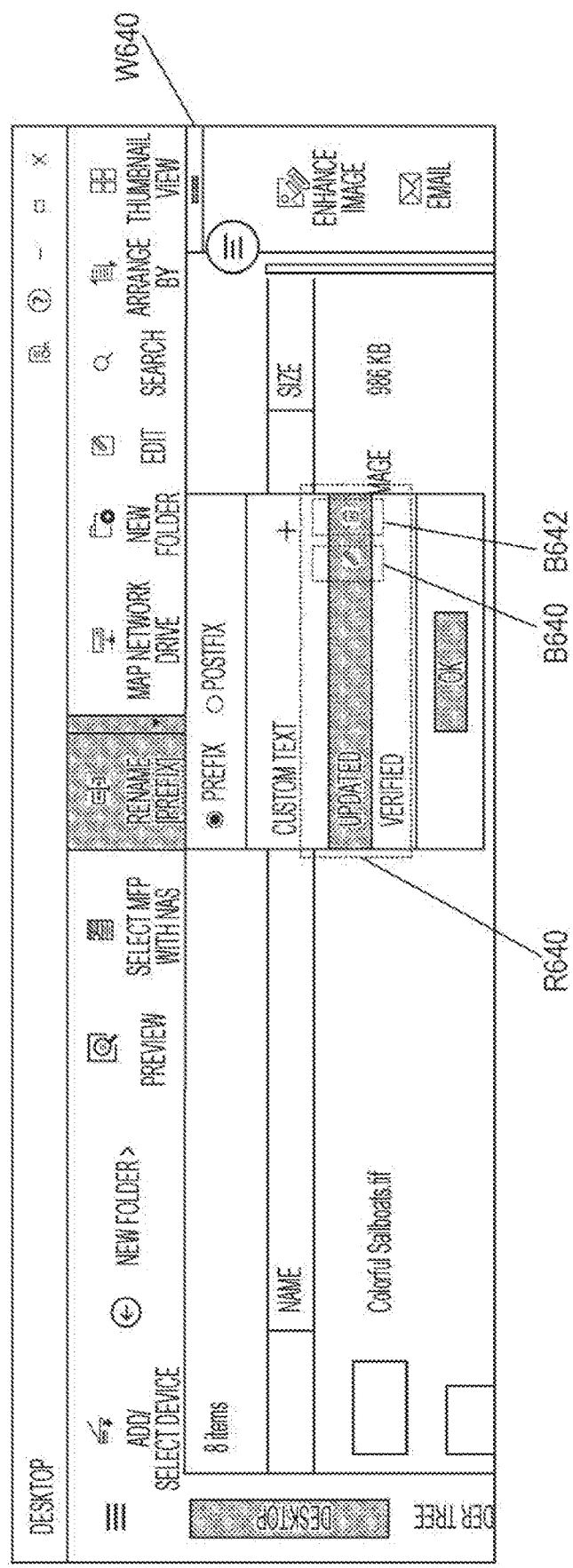
FIG. 21B is a diagram illustrating an example operation (example screen) according to the fifth embodiment.

FIG. 21B illustrates a display screen W640 on which a list of additional candidate character strings containing the additional candidate character string "updated", which is newly stored in the dialog menu, displayed in an area R640.

The additional candidate character string is displayed with an Edit button B640 and a Delete button B642. When the Edit button B640 is selected, the file management unit 102 makes the additional candidate character string editable. Specifically, the file management unit 102 makes a transition from the display screen W640 illustrated in FIG. 21B to the display screen W630 illustrated in FIG. 21A again to make the additional candidate character string editable. When the Delete button B642 is selected, the file management unit 102 deletes the additional candidate character string associated with the Delete button B642.

Figure 21C:
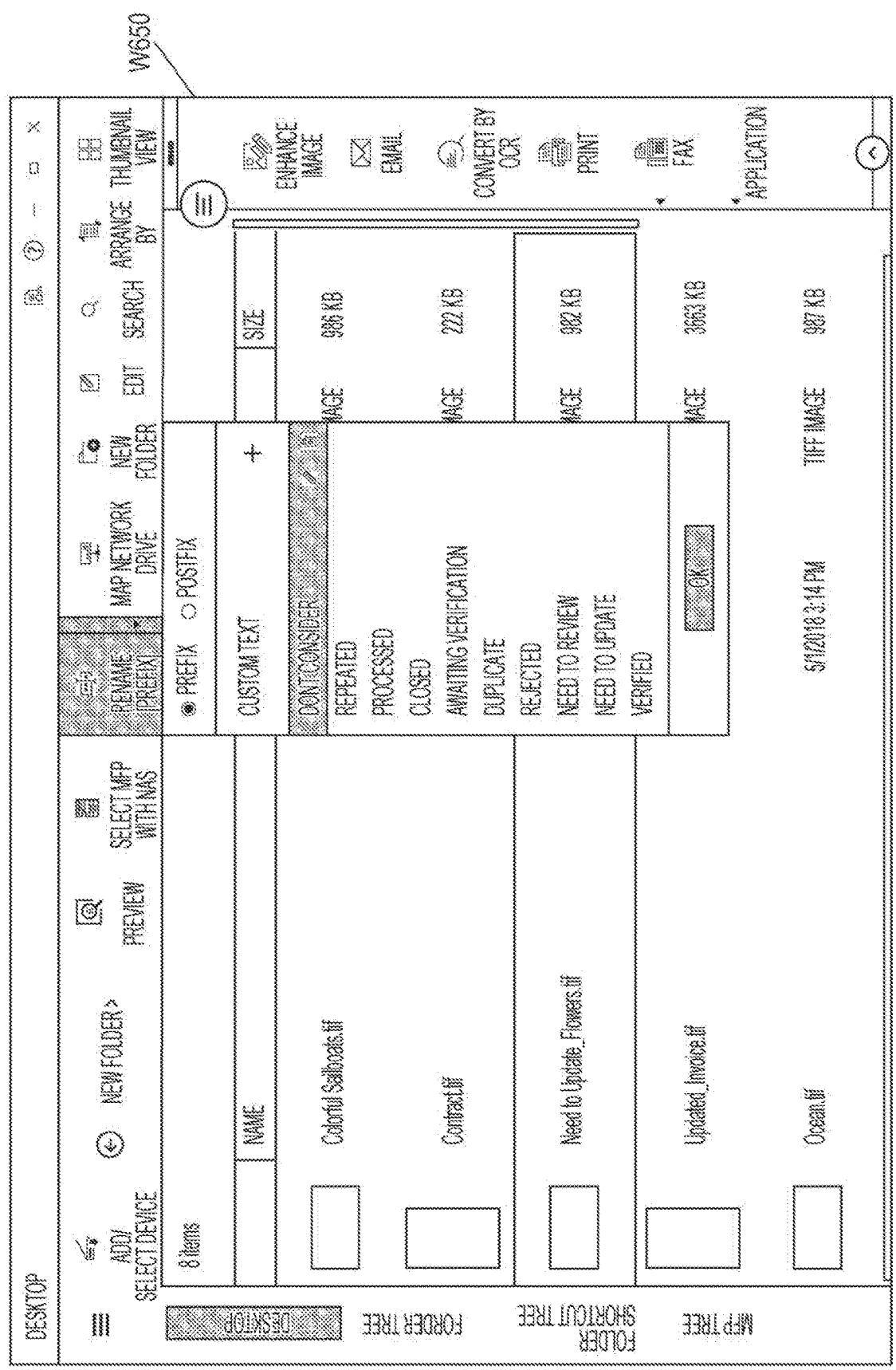
FIG. 21C is a diagram illustrating an example operation (example screen) according to the fifth embodiment.

FIG. 21C illustrates an example of a display screen W650 on which a dialog menu is generated by repeatedly performing the process described above. The user is able to select an additional character string from among a plurality of additional candidate character strings in the displayed dialog menu. In this case, the user may be able to select a plurality of additional character strings. The user may perform a drag operation or a swipe operation to rearrange the additional candidate character strings.

When the upper limit is exceeded, no further additional candidate character string may be added, or additional candidate character strings may be deleted from the oldest additional candidate character string. Additionally, an additional candidate character string that is not to be deleted may be protected, and additional candidate character strings other than the protected additional candidate character string may be deleted. Alternatively, additional candidate character strings added by a user may be deleted.

For convenience of description, additional character strings are displayed in pull-down view in this embodiment. It is sufficient to display a dialog, and a dialog may be displayed in a separate window, for example. A dialog may be separately displayed on a display screen of a user's terminal device, for example.

6. Modifications

While the embodiments of the present disclosure have been described in detail with reference to the drawings, specific configurations are not limited to those in the embodiments. Design variations and the like may be made without departing from the scope of the disclosure, and such design variations and the like also fall within the scope of the disclosure as defined in the appended claims.

In the embodiments described above, for convenience of description, a description has been made such that one advantage for each embodiment is understood. Thus, any combination of embodiments may be implemented, if necessary.

For example, the operation according to the fifth embodiment may be added to the operation according to the third embodiment such that an additional character string can be easily edited. Accordingly, any combination of embodiments may be carried out.

Further, a program operating on each of the devices in the embodiments is a program for controlling an arithmetic unit such as a CPD (a program for causing a computer to function) to implement the functions of the embodiments described above. Information handled in these devices is temporarily accumulated in a temporary storage device (e.g., a random access memory (RAM)) when the information is processed. Thereafter, the information is stored in various storage devices, such as a read-only memory (ROM), an HDD, and an SSD, and is read by the CPU, as necessary, for modification or writing.

When distributed to the market, the program can be stored and distributed on a portable recording medium or transferred to a server computer connected via a network such as the Internet. In this case, a storage device in the server computer is also included in the present disclosure.

The present disclosure contains subject matter related to that disclosed in Japanese Priority Patent Application JP 2018-166360 filed in the Japan Patent Office on Sep. 5, 2018 and Japanese Priority Patent Application JP 2019-084264 filed in the Japan Patent Office on Apr. 25, 2019, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device comprising:
 a display; and
 a controller,
 wherein the controller
  displays, on the display, a display screen having a first display region that displays a list of files, and a second display region that displays an operation button,
  selects one or more files from among the displayed list of files, and
  in response to selection of the operation button after a file is selected, renames the file in accordance with additional information associated with the operation button,
 wherein the additional information includes an additional character string, and
 wherein the controller renames, in a case that the additional character string is not added to the file name of the file, the file such that the additional character string is added to a file name of the file, and
 wherein the controller renames, in a case that the additional character string has already been added to the file name of the file, the file such that at least the file name of the file before adding the additional character string is included and such that the additional character string is not duplicated.

2. The information processing device according to claim 1, wherein the additional information further includes an additional character string position, and
 wherein the controller renames the file such that the additional character string is added to the file name at the additional character string position.

3. The information processing device according to claim 1, wherein the additional character string includes a suffix "-ed".

4. The information processing device according to claim 1, further comprising an input assembly that inputs the additional character string, wherein the controller sets, as the additional information, the additional character string input by the input assembly.

5. The information processing device according to claim 1, wherein the controller renames the file such that, each time the operation button is selected, a different additional character string is added to the file name.

6. The information processing device according to claim 1, wherein the second display region displays a plurality of operation buttons, each of the plurality of operation buttons being capable of being assigned a different additional character string.

7. The information processing device according to claim 1, further comprising a user authenticator that authenticates a user,
 wherein the controller renames the file when a user authenticated by the user authenticator has a privilege to rename the file.

8. The information processing device according to claim 1, wherein identification information identifying a user is stored in association with each of the files in the displayed list of files, and
 wherein when the controller renames the file, the controller notifies a user associated with the file of renaming of the file.

9. The information processing device according to claim 1, wherein the additional information includes a plurality of additional candidate character strings, and
 wherein the controller
  further displays, in the second display region, a designation button used to designate the additional information, and
  in response to selection of the designation button, designates one of the plurality of additional candidate character strings as the additional information.

10. The information processing device according to claim 9, wherein the designation button is displayed in association with the operation button.

11. The information processing device according to claim 9, wherein the controller executes a process of editing and/or deleting one or more additional candidate character strings among the plurality of additional candidate character strings.

12. The information processing device according to claim 1, further comprising an input assembly that inputs the additional character string,
 wherein the controller stores, as an additional candidate character string, the additional character string input by the input assembly.

13. The information processing device according to claim 1, wherein the controller, each time when the operation button is selected, changes the file name to a file name having the additional character string and a numeral indicating the number of selecting times of the operation button.

14. The information processing device according to claim 1, wherein the controller, each time when the operation button is selected, changes the file name between a file name having the additional character and a file name without the additional character string.

15. The information processing device according to claim 1, wherein the controller changes the additional character string each time when the operation button is selected.

16. A file processing method for an information processing device, the method comprising the steps of:
 displaying, on a display of the information processing device, a display screen having a first display region that displays a list of files, and a second display region that displays an operation button;
 selecting one or more files from among the displayed list of files; and
 in response to selection of the operation button after a file is selected, renaming, in a case that the additional character string is not added to the file name of the file, the file such that an additional character string is added to a file name of the file in accordance with additional information which includes an additional character string associated with the operation button, and
 wherein the controller renames, in a case that the additional character string has already been added to the file name of the file, the file such that at least the file name of the file before adding the additional character string is included and such that the additional character string is not duplicated.

17. A non-transitory recording medium storing a program that, when executed by a computer including a display and a controller, causes the computer to execute:
 displaying, on the display, a display screen having a first display region that displays a list of files, and a second display region that displays an operation button;
 selecting one or more files from among the displayed list of files; and
 in response to selection of the operation button after a file is selected, renaming, in a case that the additional character string is not added to the file name of the file, the file such that an additional character string is added to a file name of the file in accordance with additional information which includes an additional character string associated with the operation button, and
 wherein the controller renames, in a case that the additional character string has already been added to the file name of the file, the file such that at least the file name of the file before adding the additional character string is included and such that the additional character string is not duplicated.

\* \* \* \* \*